(12) United States Patent
Medina, III

(10) Patent No.: US 8,452,689 B1
(45) Date of Patent: May 28, 2013

(54) SYSTEMS AND METHODS OF CHECK DETECTION

(75) Inventor: Reynaldo Medina, III, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 204 days.

(21) Appl. No.: 12/388,005

(22) Filed: Feb. 18, 2009

(51) Int. Cl.
G06Q 40/00 (2006.01)

(52) U.S. Cl.
USPC ............... 705/37; 705/36 R; 705/38; 705/39

(58) Field of Classification Search
USPC ...................................... 705/35–39
See application file for complete search history.

(56) References Cited

U.S. PATENT DOCUMENTS

| | | |
|---|---|---|
| 3,005,282 A | 10/1961 | Christiansen |
| 3,341,820 A | 9/1967 | Grillmeier, Jr. |
| 3,576,972 A | 5/1971 | Wood |
| 3,593,913 A | 7/1971 | Bremer |
| 3,620,553 A | 11/1971 | Donovan |
| 3,648,242 A | 3/1972 | Grosbard |
| 3,800,124 A | 3/1974 | Walsh |
| 3,816,943 A | 6/1974 | Henry |
| 4,002,356 A | 1/1977 | Weidmann |
| 4,060,711 A | 11/1977 | Buros |
| 4,070,649 A | 1/1978 | Wright, Jr. et al. |
| 4,128,202 A | 12/1978 | Buros |
| 4,136,471 A | 1/1979 | Austin |
| 4,205,780 A | 6/1980 | Burns |
| 4,264,808 A | 4/1981 | Owens |
| 4,305,216 A | 12/1981 | Skelton |
| 4,321,672 A | 3/1982 | Braun |
| 4,433,436 A | 2/1984 | Carnes |
| 4,454,610 A | 6/1984 | Sziklai |
| RE31,692 E | 10/1984 | Tyburski et al. |
| 4,523,330 A | 6/1985 | Cain |
| 4,636,099 A | 1/1987 | Goldstone |
| 4,640,413 A | 2/1987 | Kaplan |

(Continued)

FOREIGN PATENT DOCUMENTS

EP 984410 A1 3/2000

OTHER PUBLICATIONS

Check Image Group Outlines Agenda Daniel Wolfe. American Banker. New York, N.Y.: Feb 13, 2009. vol. 174, Iss. 30; p. 12).*

(Continued)

*Primary Examiner* — Hani M Kazimi
*Assistant Examiner* — Clement Graham
(74) *Attorney, Agent, or Firm* — Brinks Hofer Gilson & Lione

(57) ABSTRACT

A digital image of a check may be divided into segments. The segments may be processed to determine the edges between the background data and the check data in the segments of the digital image. A histogram of each segment may be determined and used to determine the edges of the check image portions in the segments and thus the edges of the check. The data outside the edges of the check image portions in the segments may be considered to be background data and may be identified and/or removed. The segments, with the background data removed, may be recombined into an image of the check and provided into a digital image file that may be transmitted to an institution system for deposit of the check in an account.

17 Claims, 8 Drawing Sheets

U.S. PATENT DOCUMENTS

| | | | |
|---|---|---|---|
| 4,644,144 A | 2/1987 | Chandek |
| 4,722,444 A | 2/1988 | Murphy |
| 4,722,544 A | 2/1988 | Weber |
| 4,727,435 A | 2/1988 | Otani et al. |
| 4,774,663 A | 9/1988 | Musmanno |
| 4,790,475 A | 12/1988 | Griffin |
| 4,806,780 A | 2/1989 | Yamamoto |
| 4,837,693 A | 6/1989 | Schotz |
| 4,890,228 A | 12/1989 | Longfield |
| 4,927,071 A | 5/1990 | Wood |
| 4,934,587 A | 6/1990 | Mcnabb |
| 4,960,981 A | 10/1990 | Benton |
| 4,975,735 A | 12/1990 | Bright |
| 5,022,683 A | 6/1991 | Barbour |
| 5,053,607 A | 10/1991 | Carlson |
| 5,146,606 A | 9/1992 | Grondalski |
| 5,157,620 A | 10/1992 | Shaar |
| 5,159,548 A | 10/1992 | Caslavka |
| 5,191,525 A | 3/1993 | LeBrun |
| 5,193,121 A | 3/1993 | Elischer et al. |
| 5,220,501 A | 6/1993 | Lawlor |
| 5,227,863 A | 7/1993 | Bilbrey et al. |
| 5,229,589 A | 7/1993 | Schneider |
| 5,237,159 A | 8/1993 | Stephens |
| 5,257,320 A | 10/1993 | Etherington et al. |
| 5,265,008 A | 11/1993 | Benton |
| 5,321,816 A | 6/1994 | Rogan |
| 5,347,302 A | 9/1994 | Simonoff |
| 5,350,906 A | 9/1994 | Brody |
| 5,373,550 A | 12/1994 | Campbell |
| 5,419,588 A | 5/1995 | Wood |
| 5,422,467 A | 6/1995 | Graef |
| 5,475,403 A | 12/1995 | Havlovick et al. |
| 5,504,538 A | 4/1996 | Tsujihara |
| 5,504,677 A | 4/1996 | Pollin |
| 5,528,387 A | 6/1996 | Kelly et al. |
| 5,583,759 A | 12/1996 | Geer |
| 5,590,196 A | 12/1996 | Moreau |
| 5,594,225 A | 1/1997 | Botvin |
| 5,598,969 A | 2/1997 | Ong |
| 5,602,936 A | 2/1997 | Green |
| 5,610,726 A | 3/1997 | Nonoshita |
| 5,611,028 A | 3/1997 | Shibasaki |
| 5,630,073 A | 5/1997 | Nolan |
| 5,631,984 A | 5/1997 | Graf et al. |
| 5,668,897 A | 9/1997 | Stolfo |
| 5,673,320 A | 9/1997 | Ray |
| 5,677,955 A | 10/1997 | Doggett |
| 5,678,046 A | 10/1997 | Cahill et al. |
| 5,679,938 A | 10/1997 | Templeton |
| 5,680,611 A | 10/1997 | Rail |
| 5,691,524 A | 11/1997 | Josephson |
| 5,699,452 A | 12/1997 | Vaidyanathan |
| 5,734,747 A | 3/1998 | Vaidyanathan |
| 5,737,440 A | 4/1998 | Kunkler |
| 5,748,780 A | 5/1998 | Stolfo |
| 5,751,842 A | 5/1998 | Riach |
| 5,784,503 A | 7/1998 | Bleecker, III et al. |
| 5,830,609 A | 11/1998 | Warner |
| 5,832,463 A | 11/1998 | Funk |
| 5,838,814 A | 11/1998 | Moore |
| 5,863,075 A | 1/1999 | Rich |
| 5,870,456 A | 2/1999 | Rogers |
| 5,870,724 A | 2/1999 | Lawlor |
| 5,870,725 A | 2/1999 | Bellinger et al. |
| 5,878,337 A | 3/1999 | Joao |
| 5,893,101 A | 4/1999 | Balogh et al. |
| 5,897,625 A | 4/1999 | Gustin |
| 5,898,157 A | 4/1999 | Mangili et al. |
| 5,901,253 A | 5/1999 | Tretter |
| 5,903,878 A | 5/1999 | Talati |
| 5,903,881 A | 5/1999 | Schrader |
| 5,910,988 A | 6/1999 | Ballard |
| 5,917,931 A | 6/1999 | Kunkler |
| 5,924,737 A | 7/1999 | Schrupp |
| 5,926,548 A | 7/1999 | Okamoto |
| 5,930,778 A | 7/1999 | Geer |
| 5,937,396 A | 8/1999 | Konya |
| 5,940,844 A | 8/1999 | Cahill |
| 5,982,918 A | 11/1999 | Mennie |
| 5,987,439 A | 11/1999 | Gustin |
| 6,012,048 A | 1/2000 | Gustin |
| 6,014,454 A | 1/2000 | Kunkler |
| 6,021,202 A | 2/2000 | Anderson |
| 6,021,397 A * | 2/2000 | Jones et al. ............... 705/36 R |
| 6,029,887 A | 2/2000 | Furuhashi |
| 6,030,000 A | 2/2000 | Diamond |
| 6,032,137 A | 2/2000 | Ballard |
| 6,038,553 A | 3/2000 | Hyde |
| 6,053,405 A | 4/2000 | Irwin, Jr. et al. |
| 6,073,119 A | 6/2000 | Bornemisza-wahr |
| 6,085,168 A | 7/2000 | Mori |
| 6,097,834 A | 8/2000 | Krouse |
| 6,097,885 A | 8/2000 | Rayner |
| 6,105,865 A | 8/2000 | Hardesty |
| 6,141,339 A | 10/2000 | Kaplan et al. |
| 6,145,738 A | 11/2000 | Stinson |
| 6,151,426 A | 11/2000 | Lee |
| 6,159,585 A | 12/2000 | Rittenhouse |
| 6,170,744 B1 | 1/2001 | Lee |
| 6,188,506 B1 | 2/2001 | Kaiserman |
| 6,189,785 B1 | 2/2001 | Lowery |
| 6,192,165 B1 | 2/2001 | Irons |
| 6,195,694 B1 | 2/2001 | Chen et al. |
| 6,199,055 B1 | 3/2001 | Kara |
| 6,236,009 B1 | 5/2001 | Emigh et al. |
| 6,243,689 B1 | 6/2001 | Norton |
| 6,278,983 B1 | 8/2001 | Ball |
| 6,282,826 B1 | 9/2001 | Richards |
| 6,293,469 B1 | 9/2001 | Masson et al. |
| 6,304,860 B1 | 10/2001 | Martin, Jr. |
| 6,314,452 B1 | 11/2001 | Dekel |
| 6,317,727 B1 | 11/2001 | May |
| 6,328,207 B1 | 12/2001 | Gregoire et al. |
| 6,330,546 B1 | 12/2001 | Gopinathan et al. |
| 6,339,658 B1 | 1/2002 | Moccagatta |
| 6,363,164 B1 | 3/2002 | Jones et al. |
| 6,390,362 B1 | 5/2002 | Martin |
| 6,397,196 B1 | 5/2002 | Kravetz |
| 6,408,084 B1 | 6/2002 | Foley |
| 6,411,725 B1 | 6/2002 | Rhoads |
| 6,411,737 B2 | 6/2002 | Wesolkowski et al. |
| 6,411,938 B1 | 6/2002 | Gates et al. |
| 6,413,305 B1 | 7/2002 | Mehta |
| 6,417,869 B1 | 7/2002 | Do |
| 6,425,017 B1 | 7/2002 | Dievendorff |
| 6,429,952 B1 | 8/2002 | Olbricht |
| 6,439,454 B1 | 8/2002 | Masson et al. |
| 6,449,397 B1 | 9/2002 | Che-Chu |
| 6,450,403 B1 | 9/2002 | Martens |
| 6,464,134 B1 | 10/2002 | Page |
| 6,470,325 B1 | 10/2002 | Leemhuis |
| 6,505,178 B1 | 1/2003 | Flenley |
| 6,546,119 B2 | 4/2003 | Ciolli et al. |
| 6,574,609 B1 | 6/2003 | Downs |
| 6,578,760 B1 | 6/2003 | Otto |
| 6,587,837 B1 | 7/2003 | Spagna |
| 6,606,117 B1 | 8/2003 | Windle |
| 6,609,200 B2 | 8/2003 | Anderson |
| 6,611,598 B1 | 8/2003 | Hayosh |
| 6,614,930 B1 | 9/2003 | Agnihotri et al. |
| 6,643,416 B1 | 11/2003 | Daniels |
| 6,654,487 B1 | 11/2003 | Downs, Jr. |
| 6,661,910 B2 | 12/2003 | Jones et al. |
| 6,672,452 B1 | 1/2004 | Alves |
| 6,682,452 B2 | 1/2004 | Quintus |
| 6,695,204 B1 | 2/2004 | Stinson |
| 6,711,474 B1 | 3/2004 | Treyz et al. |
| 6,726,097 B2 | 4/2004 | Graef |
| 6,728,397 B2 | 4/2004 | Mcneal |
| 6,738,496 B1 | 5/2004 | Van Hall |
| 6,742,128 B1 | 5/2004 | Joiner |
| 6,745,186 B1 | 6/2004 | Testa et al. |
| 6,754,640 B2 | 6/2004 | Bozeman |
| 6,755,340 B1 | 6/2004 | Voss |
| 6,763,226 B1 | 7/2004 | McZeal |
| 6,781,962 B1 | 8/2004 | Williams |

| | | |
|---|---|---|
| 6,786,398 B1 | 9/2004 | Stinson |
| 6,789,054 B1 | 9/2004 | Makhlouf |
| 6,796,491 B2 | 9/2004 | Nakajima |
| 6,806,903 B1 | 10/2004 | Okisu et al. |
| 6,813,733 B1 | 11/2004 | Li |
| 6,829,704 B2 | 12/2004 | Zhang |
| 6,844,885 B2 | 1/2005 | Anderson |
| 6,856,965 B1 | 2/2005 | Stinson |
| 6,863,214 B2 | 3/2005 | Garner et al. |
| 6,870,947 B2 | 3/2005 | Kelland |
| 6,883,140 B1 | 4/2005 | Acker |
| 6,898,314 B2 | 5/2005 | Kung et al. |
| 6,902,105 B2 | 6/2005 | Koakutsu |
| 6,913,188 B2 | 7/2005 | Wong |
| 6,931,591 B1 | 8/2005 | Brown |
| 6,934,719 B2 | 8/2005 | Nally |
| 6,957,770 B1 | 10/2005 | Robinson |
| 6,961,689 B1 | 11/2005 | Greenberg |
| 6,970,843 B1 | 11/2005 | Forte |
| 6,973,589 B2 | 12/2005 | Wright |
| 6,983,886 B2 | 1/2006 | Natsukari et al. |
| 6,993,507 B2 | 1/2006 | Meyer |
| 6,996,263 B2 | 2/2006 | Jones et al. |
| 6,999,943 B1 | 2/2006 | Johnson |
| 7,003,040 B2 | 2/2006 | Yi |
| 7,004,382 B2 | 2/2006 | Sandru |
| 7,010,155 B2 | 3/2006 | Koakutsu et al. |
| 7,010,507 B1 | 3/2006 | Anderson |
| 7,016,704 B2 | 3/2006 | Pallakoff |
| 7,039,048 B1 | 5/2006 | Monta |
| 7,058,036 B1 | 6/2006 | Yu |
| 7,062,099 B2 | 6/2006 | Li et al. |
| 7,062,456 B1 | 6/2006 | Riehl et al. |
| 7,062,768 B2 | 6/2006 | Kubo |
| 7,072,862 B1 | 7/2006 | Wilson |
| 7,076,458 B2 | 7/2006 | Lawlor et al. |
| 7,086,003 B2 | 8/2006 | Demsky |
| 7,092,561 B2 | 8/2006 | Downs, Jr. |
| 7,104,443 B1 | 9/2006 | Paul et al. |
| 7,113,925 B2 | 9/2006 | Waserstein |
| 7,114,649 B2 | 10/2006 | Nelson |
| 7,139,594 B2 | 11/2006 | Nagatomo |
| 7,140,539 B1 | 11/2006 | Crews |
| 7,163,347 B2 | 1/2007 | Lugg |
| 7,178,721 B2 | 2/2007 | Maloney |
| 7,181,430 B1 | 2/2007 | Buchanan |
| 7,184,980 B2 | 2/2007 | Allen-Rouman et al. |
| 7,197,173 B2 | 3/2007 | Jones et al. |
| 7,200,255 B2 | 4/2007 | Jones |
| 7,204,412 B2 | 4/2007 | Foss, Jr. |
| 7,216,106 B1 | 5/2007 | Buchanan |
| 7,219,082 B2 | 5/2007 | Forte |
| 7,219,831 B2 | 5/2007 | Murata |
| 7,249,076 B1 | 7/2007 | Pendleton |
| 7,252,224 B2 | 8/2007 | Verma |
| 7,257,246 B1 | 8/2007 | Brodie et al. |
| 7,266,230 B2 | 9/2007 | Doran |
| 7,290,034 B2 | 10/2007 | Budd |
| 7,299,970 B1 | 11/2007 | Ching |
| 7,299,979 B2 | 11/2007 | Phillips |
| 7,313,543 B1 | 12/2007 | Crane |
| 7,314,163 B1 | 1/2008 | Crews et al. |
| 7,321,874 B2 | 1/2008 | Dilip |
| 7,321,875 B2 | 1/2008 | Dilip |
| 7,325,725 B2 | 2/2008 | Foss, Jr. |
| 7,328,190 B2 | 2/2008 | Smith et al. |
| 7,330,604 B2 | 2/2008 | Wu et al. |
| 7,336,813 B2 | 2/2008 | Prakash et al. |
| 7,343,320 B1 | 3/2008 | Treyz |
| 7,349,566 B2 | 3/2008 | Jones et al. |
| 7,356,505 B2 | 4/2008 | March |
| 7,377,425 B1 | 5/2008 | Ma |
| 7,379,978 B2 | 5/2008 | Anderson |
| 7,385,631 B2 | 6/2008 | Maeno |
| 7,386,511 B2 | 6/2008 | Buchanan |
| 7,391,897 B2 | 6/2008 | Jones |
| 7,391,934 B2 | 6/2008 | Goodall et al. |
| 7,392,935 B2 | 7/2008 | Byrne |
| 7,401,048 B2 | 7/2008 | Rosedale |
| 7,403,917 B1 | 7/2008 | Larsen |
| 7,406,198 B2 | 7/2008 | Aoki et al. |
| 7,421,107 B2 | 9/2008 | Lugg |
| 7,421,410 B1 | 9/2008 | Schechtman et al. |
| 7,433,098 B2 | 10/2008 | Klein et al. |
| 7,437,327 B2 | 10/2008 | Lam |
| 7,440,924 B2 | 10/2008 | Buchanan |
| 7,447,347 B2 | 11/2008 | Weber |
| 7,455,220 B2 | 11/2008 | Phillips |
| 7,455,221 B2 | 11/2008 | Sheaffer |
| 7,460,108 B2 | 12/2008 | Tamura |
| 7,461,779 B2 | 12/2008 | Ramachandran |
| 7,461,780 B2 | 12/2008 | Potts |
| 7,471,818 B1 | 12/2008 | Price |
| 7,475,040 B2 | 1/2009 | Buchanan |
| 7,477,923 B2 | 1/2009 | Wallmark |
| 7,480,382 B2 | 1/2009 | Dunbar |
| 7,480,422 B2 | 1/2009 | Ackley et al. |
| 7,489,953 B2 | 2/2009 | Griffin |
| 7,490,242 B2 | 2/2009 | Torres |
| 7,497,429 B2 | 3/2009 | Reynders |
| 7,503,486 B2 | 3/2009 | Ahles |
| 7,505,759 B1 | 3/2009 | Rahman |
| 7,506,261 B2 | 3/2009 | Satou |
| 7,509,287 B2 | 3/2009 | Nutahara |
| 7,512,564 B1 | 3/2009 | Geer |
| 7,519,560 B2 | 4/2009 | Lam |
| 7,520,420 B2 | 4/2009 | Phillips |
| 7,520,422 B1 | 4/2009 | Robinson et al. |
| 7,536,354 B1 | 5/2009 | deGroeve |
| 7,536,440 B2 | 5/2009 | Budd |
| 7,539,646 B2 | 5/2009 | Gilder |
| 7,540,408 B2 | 6/2009 | Levine |
| 7,542,598 B2 | 6/2009 | Jones |
| 7,545,529 B2 | 6/2009 | Borrey et al. |
| 7,548,641 B2 | 6/2009 | Gilson et al. |
| 7,566,002 B2 | 7/2009 | Love et al. |
| 7,571,848 B2 | 8/2009 | Cohen |
| 7,587,066 B2 | 9/2009 | Cordery et al. |
| 7,587,363 B2 | 9/2009 | Cataline |
| 7,590,275 B2 | 9/2009 | Clarke et al. |
| 7,599,543 B2 | 10/2009 | Jones |
| 7,599,888 B2 | 10/2009 | Manfre |
| 7,602,956 B2 | 10/2009 | Jones |
| 7,606,762 B1 | 10/2009 | Heit |
| 7,609,873 B2 | 10/2009 | Foth et al. |
| 7,619,721 B2 | 11/2009 | Jones |
| 7,620,231 B2 | 11/2009 | Jones |
| 7,620,604 B1 | 11/2009 | Bueche, Jr. |
| 7,630,518 B2 | 12/2009 | Frew et al. |
| 7,644,037 B1 | 1/2010 | Ostrovsky |
| 7,644,043 B2 | 1/2010 | Minowa |
| 7,647,275 B2 | 1/2010 | Jones |
| 7,668,363 B2 | 2/2010 | Price |
| 7,672,940 B2 | 3/2010 | Viola |
| 7,676,409 B1 | 3/2010 | Ahmad |
| 7,680,735 B2 | 3/2010 | Loy |
| 7,689,482 B2 | 3/2010 | Lam |
| 7,697,776 B2 | 4/2010 | Wu et al. |
| 7,698,222 B1 | 4/2010 | Bueche, Jr. |
| 7,702,588 B2 | 4/2010 | Gilder |
| 7,734,545 B1 | 6/2010 | Fogliano |
| 7,743,979 B2 | 6/2010 | Fredman |
| 7,753,268 B1 | 7/2010 | Robinson et al. |
| 7,766,244 B1 | 8/2010 | Field |
| 7,769,650 B2 | 8/2010 | Bleunven |
| 7,792,752 B1 | 9/2010 | Kay |
| 7,792,753 B1 | 9/2010 | Slater et al. |
| 7,810,714 B2 | 10/2010 | Murata |
| 7,818,245 B2 | 10/2010 | Prakash et al. |
| 7,856,402 B1 | 12/2010 | Kay |
| 7,873,200 B1 | 1/2011 | Oakes, III et al. |
| 7,876,949 B1 | 1/2011 | Oakes, III et al. |
| 7,885,451 B1 | 2/2011 | Walls et al. |
| 7,885,880 B1 | 2/2011 | Prasad et al. |
| 7,894,094 B2 | 2/2011 | Nacman et al. |
| 7,896,232 B1 | 3/2011 | Prasad et al. |
| 7,900,822 B1 | 3/2011 | Prasad et al. |
| 7,912,785 B1 | 3/2011 | Kay |

| Patent/Publication | Date | Name |
|---|---|---|
| 7,949,587 B1 | 5/2011 | Morris et al. |
| 7,962,411 B1 | 6/2011 | Prasad et al. |
| 7,970,677 B1 | 6/2011 | Oakes, III et al. |
| 7,974,899 B1 | 7/2011 | Prasad et al. |
| 7,978,900 B2 | 7/2011 | Nepomniachtchi et al. |
| 7,996,314 B1 | 8/2011 | Smith et al. |
| 7,996,315 B1 | 8/2011 | Smith et al. |
| 7,996,316 B1 | 8/2011 | Smith et al. |
| 8,001,051 B1 | 8/2011 | Smith et al. |
| 8,045,784 B2 | 10/2011 | Price et al. |
| 8,046,301 B1 | 10/2011 | Smith et al. |
| 2001/0014881 A1 | 8/2001 | Drummond |
| 2001/0018739 A1 | 8/2001 | Anderson |
| 2001/0027994 A1 | 10/2001 | Hayashida |
| 2001/0037299 A1 | 11/2001 | Nichols et al. |
| 2001/0042171 A1 | 11/2001 | Vermeulen |
| 2001/0042785 A1* | 11/2001 | Walker et al. ............ 235/379 |
| 2001/0043748 A1 | 11/2001 | Wesolkowski |
| 2001/0047330 A1 | 11/2001 | Gephart |
| 2001/0054020 A1 | 12/2001 | Barth |
| 2002/0001393 A1 | 1/2002 | Jones |
| 2002/0016763 A1 | 2/2002 | March |
| 2002/0016769 A1 | 2/2002 | Barbara et al. |
| 2002/0032656 A1 | 3/2002 | Chen |
| 2002/0038289 A1 | 3/2002 | Lawlor et al. |
| 2002/0052841 A1 | 5/2002 | Guthrie |
| 2002/0052853 A1 | 5/2002 | Munoz |
| 2002/0065786 A1 | 5/2002 | Martens |
| 2002/0072974 A1 | 6/2002 | Pugliese |
| 2002/0075524 A1 | 6/2002 | Blair |
| 2002/0084321 A1 | 7/2002 | Martens |
| 2002/0087467 A1 | 7/2002 | Mascavage, III et al. |
| 2002/0107809 A1 | 8/2002 | Biddle et al. |
| 2002/0116329 A1 | 8/2002 | Serbetcioglu |
| 2002/0116335 A1 | 8/2002 | Star |
| 2002/0118891 A1 | 8/2002 | Rudd |
| 2002/0120562 A1 | 8/2002 | Opiela |
| 2002/0129249 A1 | 9/2002 | Maillard et al. |
| 2002/0133409 A1 | 9/2002 | Sawano et al. |
| 2002/0138522 A1 | 9/2002 | Muralidhar |
| 2002/0147798 A1 | 10/2002 | Huang |
| 2002/0150279 A1 | 10/2002 | Scott |
| 2002/0152160 A1 | 10/2002 | Allen-Rouman et al. |
| 2002/0152161 A1 | 10/2002 | Aoike |
| 2002/0152164 A1 | 10/2002 | Dutta |
| 2002/0152165 A1 | 10/2002 | Dutta et al. |
| 2002/0152169 A1 | 10/2002 | Dutta |
| 2002/0171820 A1 | 11/2002 | Okamura |
| 2002/0178112 A1 | 11/2002 | Goeller |
| 2002/0188564 A1 | 12/2002 | Star |
| 2002/0195485 A1 | 12/2002 | Pomerleau et al. |
| 2003/0005326 A1 | 1/2003 | Flemming |
| 2003/0023557 A1 | 1/2003 | Moore |
| 2003/0038227 A1 | 2/2003 | Sesek |
| 2003/0055756 A1 | 3/2003 | Allan |
| 2003/0055776 A1 | 3/2003 | Samuelson |
| 2003/0074315 A1 | 4/2003 | Lam |
| 2003/0075596 A1 | 4/2003 | Koakutsu |
| 2003/0075916 A1 | 4/2003 | Gorski |
| 2003/0081824 A1 | 5/2003 | Mennie |
| 2003/0093367 A1 | 5/2003 | Allen-Rouman et al. |
| 2003/0093369 A1 | 5/2003 | Ijichi et al. |
| 2003/0102714 A1 | 6/2003 | Rhodes et al. |
| 2003/0105688 A1 | 6/2003 | Brown |
| 2003/0105714 A1 | 6/2003 | Alarcon-Luther et al. |
| 2003/0139999 A1 | 7/2003 | Rowe |
| 2003/0159046 A1 | 8/2003 | Choi et al. |
| 2003/0167225 A1 | 9/2003 | Adams |
| 2003/0191615 A1 | 10/2003 | Bailey |
| 2003/0191869 A1 | 10/2003 | Williams |
| 2003/0200174 A1 | 10/2003 | Star |
| 2003/0212904 A1 | 11/2003 | Randle et al. |
| 2003/0217005 A1 | 11/2003 | Drummond et al. |
| 2003/0225705 A1 | 12/2003 | Park et al. |
| 2003/0233278 A1 | 12/2003 | Marshall |
| 2003/0233318 A1 | 12/2003 | King et al. |
| 2004/0010466 A1 | 1/2004 | Anderson |
| 2004/0012496 A1 | 1/2004 | DeSouza |
| 2004/0013284 A1 | 1/2004 | Yu |
| 2004/0024626 A1 | 2/2004 | Bruijning |
| 2004/0024708 A1 | 2/2004 | Masuda |
| 2004/0030741 A1 | 2/2004 | Wolton et al. |
| 2004/0057697 A1 | 3/2004 | Renzi |
| 2004/0058705 A1 | 3/2004 | Morgan |
| 2004/0066031 A1 | 4/2004 | Wong |
| 2004/0069841 A1 | 4/2004 | Wong |
| 2004/0071333 A1 | 4/2004 | Douglas et al. |
| 2004/0076320 A1 | 4/2004 | Downs, Jr. |
| 2004/0078299 A1 | 4/2004 | Down-Logan |
| 2004/0080795 A1 | 4/2004 | Bean |
| 2004/0089711 A1 | 5/2004 | Sandru |
| 2004/0093303 A1 | 5/2004 | Picciallo |
| 2004/0093305 A1 | 5/2004 | Kight |
| 2004/0103057 A1 | 5/2004 | Melbert et al. |
| 2004/0103296 A1 | 5/2004 | Harp |
| 2004/0109596 A1 | 6/2004 | Doran |
| 2004/0110975 A1 | 6/2004 | Osinski et al. |
| 2004/0117302 A1* | 6/2004 | Weichert et al. ............ 705/40 |
| 2004/0122754 A1 | 6/2004 | Stevens |
| 2004/0133511 A1 | 7/2004 | Smith et al. |
| 2004/0138974 A1 | 7/2004 | Shimamura |
| 2004/0148235 A1 | 7/2004 | Craig |
| 2004/0158549 A1 | 8/2004 | Matena |
| 2004/0165096 A1 | 8/2004 | Maeno |
| 2004/0170259 A1 | 9/2004 | Park |
| 2004/0210515 A1 | 10/2004 | Hughes |
| 2004/0210523 A1 | 10/2004 | Gains et al. |
| 2004/0228277 A1 | 11/2004 | Williams |
| 2004/0236647 A1 | 11/2004 | Acharya |
| 2004/0236688 A1 | 11/2004 | Bozeman |
| 2004/0240722 A1 | 12/2004 | Tsuji et al. |
| 2004/0245324 A1 | 12/2004 | Chen |
| 2004/0247199 A1 | 12/2004 | Murai et al. |
| 2004/0248600 A1 | 12/2004 | Kim |
| 2004/0252679 A1 | 12/2004 | Williams |
| 2004/0260636 A1 | 12/2004 | Marceau |
| 2004/0267666 A1 | 12/2004 | Minami |
| 2005/0001421 A1 | 1/2005 | Luth et al. |
| 2005/0010108 A1 | 1/2005 | Rahn et al. |
| 2005/0021466 A1 | 1/2005 | Buchanan et al. |
| 2005/0033645 A1 | 2/2005 | Duphily |
| 2005/0033685 A1 | 2/2005 | Reyes |
| 2005/0033695 A1 | 2/2005 | Minowa |
| 2005/0035193 A1 | 2/2005 | Gustin et al. |
| 2005/0038746 A1 | 2/2005 | Latimer et al. |
| 2005/0038754 A1 | 2/2005 | Geist |
| 2005/0044042 A1 | 2/2005 | Mendiola |
| 2005/0044577 A1 | 2/2005 | Jerding |
| 2005/0049950 A1 | 3/2005 | Johnson |
| 2005/0071283 A1 | 3/2005 | Randle et al. |
| 2005/0075969 A1 | 4/2005 | Nielson |
| 2005/0075974 A1 | 4/2005 | Turgeon |
| 2005/0078336 A1 | 4/2005 | Ferlitsch |
| 2005/0080725 A1 | 4/2005 | Pick |
| 2005/0082364 A1 | 4/2005 | Alvarez et al. |
| 2005/0086140 A1 | 4/2005 | Ireland |
| 2005/0086168 A1 | 4/2005 | Alvarez |
| 2005/0091161 A1 | 4/2005 | Gustin |
| 2005/0096992 A1 | 5/2005 | Geisel |
| 2005/0097019 A1 | 5/2005 | Jacobs |
| 2005/0097046 A1 | 5/2005 | Singfield |
| 2005/0097050 A1 | 5/2005 | Orcutt |
| 2005/0108164 A1 | 5/2005 | Salafia |
| 2005/0108168 A1 | 5/2005 | Halpin |
| 2005/0115110 A1 | 6/2005 | Dinkins |
| 2005/0125338 A1 | 6/2005 | Tidwell et al. |
| 2005/0125360 A1 | 6/2005 | Tidwell et al. |
| 2005/0127160 A1 | 6/2005 | Fujikawa |
| 2005/0131820 A1 | 6/2005 | Rodriguez |
| 2005/0149436 A1 | 7/2005 | Elterich |
| 2005/0168566 A1 | 8/2005 | Tada |
| 2005/0171899 A1 | 8/2005 | Dunn |
| 2005/0171907 A1 | 8/2005 | Lewis |
| 2005/0177499 A1 | 8/2005 | Thomas |
| 2005/0177518 A1 | 8/2005 | Brown |
| 2005/0182710 A1 | 8/2005 | Andersson |
| 2005/0188306 A1 | 8/2005 | Mackenzie |
| 2005/0205661 A1 | 9/2005 | Taylor |

| | | |
|---|---|---|
| 2005/0209961 A1 | 9/2005 | Michelsen |
| 2005/0228733 A1 | 10/2005 | Bent |
| 2005/0252955 A1 | 11/2005 | Sugai |
| 2005/0267843 A1 | 12/2005 | Acharya |
| 2005/0268107 A1 | 12/2005 | Harris et al. |
| 2005/0269412 A1 | 12/2005 | Chiu |
| 2005/0273368 A1 | 12/2005 | Hutten et al. |
| 2005/0278250 A1 | 12/2005 | Zair |
| 2005/0281448 A1 | 12/2005 | Lugg |
| 2005/0281471 A1 | 12/2005 | LeComte |
| 2005/0281474 A1 | 12/2005 | Huang |
| 2005/0289030 A1 | 12/2005 | Smith |
| 2005/0289182 A1 | 12/2005 | Pandian et al. |
| 2006/0002426 A1 | 1/2006 | Madour |
| 2006/0004660 A1 | 1/2006 | Pranger |
| 2006/0025697 A1 | 2/2006 | Kurzweil |
| 2006/0039628 A1 | 2/2006 | Li et al. |
| 2006/0039629 A1 | 2/2006 | Li |
| 2006/0041506 A1 | 2/2006 | Mason et al. |
| 2006/0045321 A1 | 3/2006 | Yu |
| 2006/0047593 A1 | 3/2006 | Naratil |
| 2006/0053056 A1 | 3/2006 | Alspach-Goss |
| 2006/0059085 A1 | 3/2006 | Tucker |
| 2006/0064368 A1 | 3/2006 | Forte |
| 2006/0080245 A1 | 4/2006 | Bahl |
| 2006/0085357 A1 | 4/2006 | Pizarro |
| 2006/0102704 A1 | 5/2006 | Reynders |
| 2006/0106691 A1 | 5/2006 | Sheaffer |
| 2006/0106717 A1 | 5/2006 | Randle |
| 2006/0110063 A1 | 5/2006 | Weiss |
| 2006/0112013 A1 | 5/2006 | Maloney |
| 2006/0115110 A1 | 6/2006 | Rodriguez |
| 2006/0115141 A1 | 6/2006 | Koakutsu |
| 2006/0118613 A1 | 6/2006 | McMann |
| 2006/0144924 A1 | 7/2006 | Stover |
| 2006/0144950 A1 | 7/2006 | Johnson |
| 2006/0161501 A1 | 7/2006 | Waserstein |
| 2006/0164682 A1 | 7/2006 | Lev |
| 2006/0167818 A1 | 7/2006 | Wentker et al. |
| 2006/0182331 A1 | 8/2006 | Gilson et al. |
| 2006/0182332 A1 | 8/2006 | Weber |
| 2006/0186194 A1 | 8/2006 | Richardson et al. |
| 2006/0206506 A1 | 9/2006 | Fitzpatrick |
| 2006/0208059 A1 | 9/2006 | Cable et al. |
| 2006/0210138 A1 | 9/2006 | Hilton et al. |
| 2006/0212391 A1 | 9/2006 | Norman et al. |
| 2006/0214940 A1 | 9/2006 | Kinoshita |
| 2006/0215204 A1 | 9/2006 | Miyamoto et al. |
| 2006/0215230 A1 | 9/2006 | Borrey et al. |
| 2006/0222260 A1 | 10/2006 | Sambongi et al. |
| 2006/0229976 A1 | 10/2006 | Jung |
| 2006/0229986 A1 | 10/2006 | Corder |
| 2006/0238503 A1 | 10/2006 | Smith |
| 2006/0242062 A1 | 10/2006 | Peterson |
| 2006/0242063 A1 | 10/2006 | Peterson |
| 2006/0249567 A1 | 11/2006 | Byrne |
| 2006/0274164 A1 | 12/2006 | Kimura et al. |
| 2006/0279628 A1 | 12/2006 | Fleming |
| 2006/0282383 A1 | 12/2006 | Doran |
| 2006/0291744 A1 | 12/2006 | Ikeda et al. |
| 2007/0016796 A1 | 1/2007 | Singhal |
| 2007/0019243 A1* | 1/2007 | Sato et al. .................... 358/3.27 |
| 2007/0022053 A1 | 1/2007 | Waserstein |
| 2007/0027802 A1 | 2/2007 | VanDeburg et al. |
| 2007/0031022 A1 | 2/2007 | Frew |
| 2007/0038561 A1 | 2/2007 | Vancini et al. |
| 2007/0041629 A1 | 2/2007 | Prakash et al. |
| 2007/0050292 A1 | 3/2007 | Yarbrough |
| 2007/0053574 A1 | 3/2007 | Verma et al. |
| 2007/0058851 A1 | 3/2007 | Quine |
| 2007/0063016 A1 | 3/2007 | Myatt |
| 2007/0064991 A1 | 3/2007 | Douglas et al. |
| 2007/0065143 A1 | 3/2007 | Didow et al. |
| 2007/0075772 A1 | 4/2007 | Kokubo |
| 2007/0076940 A1 | 4/2007 | Goodall et al. |
| 2007/0076941 A1 | 4/2007 | Carreon et al. |
| 2007/0077921 A1 | 4/2007 | Hayashi |
| 2007/0080207 A1 | 4/2007 | Williams |
| 2007/0082700 A1 | 4/2007 | Landschaft |
| 2007/0084911 A1 | 4/2007 | Crowell |
| 2007/0086642 A1* | 4/2007 | Foth et al. .................... 382/137 |
| 2007/0086643 A1 | 4/2007 | Spier |
| 2007/0094088 A1 | 4/2007 | Mastie |
| 2007/0094140 A1 | 4/2007 | Riney et al. |
| 2007/0100748 A1 | 5/2007 | Dheer |
| 2007/0110277 A1 | 5/2007 | Hayduchok et al. |
| 2007/0118472 A1 | 5/2007 | Allen-Rouman et al. |
| 2007/0122024 A1 | 5/2007 | Haas et al. |
| 2007/0127805 A1 | 6/2007 | Foth et al. |
| 2007/0129955 A1 | 6/2007 | Dalmia |
| 2007/0136198 A1 | 6/2007 | Foth et al. |
| 2007/0140545 A1 | 6/2007 | Rossignoli |
| 2007/0140594 A1 | 6/2007 | Franklin |
| 2007/0143208 A1 | 6/2007 | Varga |
| 2007/0150337 A1 | 6/2007 | Hawkins et al. |
| 2007/0156438 A1 | 7/2007 | Popadic |
| 2007/0168265 A1 | 7/2007 | Rosenberger |
| 2007/0171288 A1 | 7/2007 | Inoue |
| 2007/0172107 A1 | 7/2007 | Jones et al. |
| 2007/0172148 A1 | 7/2007 | Hawley |
| 2007/0179883 A1 | 8/2007 | Questembert |
| 2007/0183000 A1 | 8/2007 | Eisen et al. |
| 2007/0194102 A1 | 8/2007 | Cohen |
| 2007/0198432 A1 | 8/2007 | Pitroda et al. |
| 2007/0203708 A1 | 8/2007 | Polcyn et al. |
| 2007/0208816 A1 | 9/2007 | Baldwin et al. |
| 2007/0217669 A1 | 9/2007 | Swift et al. |
| 2007/0235518 A1 | 10/2007 | Mueller et al. |
| 2007/0235520 A1 | 10/2007 | Smith et al. |
| 2007/0241179 A1 | 10/2007 | Davis |
| 2007/0244782 A1 | 10/2007 | Chimento |
| 2007/0246525 A1 | 10/2007 | Smith et al. |
| 2007/0251992 A1 | 11/2007 | Sharma et al. |
| 2007/0255652 A1 | 11/2007 | Tumminaro |
| 2007/0255653 A1 | 11/2007 | Tumminaro |
| 2007/0255662 A1 | 11/2007 | Tumminaro |
| 2007/0258634 A1 | 11/2007 | Simonoff |
| 2007/0271182 A1 | 11/2007 | Prakash et al. |
| 2007/0278286 A1 | 12/2007 | Crowell et al. |
| 2007/0288380 A1 | 12/2007 | Starrs |
| 2007/0288382 A1 | 12/2007 | Narayanan et al. |
| 2007/0295803 A1 | 12/2007 | Levine et al. |
| 2007/0299928 A1 | 12/2007 | Kohli et al. |
| 2008/0002911 A1 | 1/2008 | Eisen |
| 2008/0021802 A1 | 1/2008 | Pendleton |
| 2008/0040280 A1 | 2/2008 | Davis |
| 2008/0052182 A1 | 2/2008 | Marshall |
| 2008/0059376 A1 | 3/2008 | Davis |
| 2008/0063253 A1 | 3/2008 | Wood |
| 2008/0068674 A1 | 3/2008 | McIntyre |
| 2008/0071721 A1 | 3/2008 | Wang |
| 2008/0080760 A1 | 4/2008 | Ronca |
| 2008/0086420 A1 | 4/2008 | Gilder et al. |
| 2008/0086421 A1 | 4/2008 | Gilder |
| 2008/0091599 A1 | 4/2008 | Foss, Jr. |
| 2008/0097899 A1 | 4/2008 | Jackson |
| 2008/0103790 A1 | 5/2008 | Abernethy |
| 2008/0103967 A1 | 5/2008 | Ackert et al. |
| 2008/0113674 A1 | 5/2008 | Baig |
| 2008/0114739 A1 | 5/2008 | Hayes |
| 2008/0117991 A1 | 5/2008 | Peddireddy |
| 2008/0119178 A1 | 5/2008 | Peddireddy |
| 2008/0133411 A1 | 6/2008 | Jones et al. |
| 2008/0147549 A1 | 6/2008 | Rathbun |
| 2008/0156438 A1 | 7/2008 | Stumphauzer et al. |
| 2008/0162350 A1 | 7/2008 | Allen-Rouman et al. |
| 2008/0162371 A1 | 7/2008 | Rampell et al. |
| 2008/0177659 A1 | 7/2008 | Lacey et al. |
| 2008/0180750 A1 | 7/2008 | Feldman |
| 2008/0208727 A1 | 8/2008 | McLaughlin et al. |
| 2008/0214180 A1 | 9/2008 | Cunningham et al. |
| 2008/0219543 A1 | 9/2008 | Csulits |
| 2008/0245869 A1 | 10/2008 | Berkun et al. |
| 2008/0247629 A1 | 10/2008 | Gilder |
| 2008/0247655 A1 | 10/2008 | Yano |
| 2008/0249931 A1 | 10/2008 | Gilder |
| 2008/0249951 A1 | 10/2008 | Gilder et al. |
| 2008/0262953 A1 | 10/2008 | Anderson |

| | | |
|---|---|---|
| 2008/0275821 A1 | 11/2008 | Bishop et al. |
| 2008/0316542 A1 | 12/2008 | Mindrum et al. |
| 2009/0024520 A1 | 1/2009 | Drory et al. |
| 2009/0046938 A1 | 2/2009 | Yoder |
| 2009/0060396 A1 | 3/2009 | Blessan et al. |
| 2009/0108080 A1 | 4/2009 | Meyer |
| 2009/0110281 A1 | 4/2009 | Hirabayashi |
| 2009/0141962 A1 | 6/2009 | Borgia et al. |
| 2009/0166406 A1 | 7/2009 | Pigg et al. |
| 2009/0171819 A1 | 7/2009 | Emde |
| 2009/0171825 A1 | 7/2009 | Roman |
| 2009/0173781 A1 | 7/2009 | Ramachandran |
| 2009/0190823 A1 | 7/2009 | Walters |
| 2009/0192938 A1 | 7/2009 | Amos |
| 2009/0236413 A1 | 9/2009 | Mueller et al. |
| 2009/0252437 A1 | 10/2009 | Li |
| 2009/0254447 A1 | 10/2009 | Blades |
| 2009/0281904 A1 | 11/2009 | Pharris |
| 2009/0313167 A1 | 12/2009 | Dujari |
| 2010/0007899 A1 | 1/2010 | Lay |
| 2010/0027679 A1 | 2/2010 | Sunahara et al. |
| 2010/0047000 A1 | 2/2010 | Park et al. |
| 2010/0057578 A1 | 3/2010 | Blair et al. |
| 2010/0061446 A1 | 3/2010 | Hands et al. |
| 2010/0082470 A1 | 4/2010 | Walach |
| 2010/0165015 A1 | 7/2010 | Barkley et al. |
| 2010/0226559 A1 | 9/2010 | Najari et al. |
| 2010/0260408 A1 | 10/2010 | Prakash et al. |
| 2010/0262522 A1 | 10/2010 | Anderson et al. |
| 2010/0312705 A1 | 12/2010 | Caruso et al. |
| 2011/0112967 A1 | 5/2011 | Anderson et al. |

OTHER PUBLICATIONS

Richey, J. C. et al.: "EE 4530 Check Imaging", Nov. 18, 2008, 10 pages.

Canon: "ImageFormula CR-55 CR-25, Improve Your Bottom Line With Front-Line Efficiencies", 0117W117, 1207-55/25-10M-BSP, 2007, 4 pages.

White, J.M. et ai, "lmageThreshoulding for Optical Character Recognition and Other Applications Requiring Character Image Extraction", IBM J. Res. Develop, 1983, vol. 27.

Ritzer, J.R. "Hinky Dinky helped spearhead POS, remote banking movement", Bank System & Equipment, vol. 21, No. 12 pp. 51-54, Dec. 1984.

Dinan, R.F. Dinan et aI., "lmagePlus High Performance Transaction System", IBM Systems Journal; 1990, pp. 431-434; vol. 29, No. 3.

Gupta, Amar et aI., "An Integrated Architecture for Recognition of Totally Unconstrained Handwritten Numerals"; International Journal of Pattern Recognition and Artificial Intelligence; 1993, pp. 757-773; vol. 7, No. 4.

Masonson, L. "Check truncation and ACH trends—automated clearing houses," healthcare financial management association, http://WWN.findarticles.com/p/articles/mLm3276/is_n7_v47/ai_14466034/print, 1993.

Zhang, C.Y., "Robust Estimation and Image Combining," Astronomical Data Analysis Software and Systems IV, ASP Conference Series, 1995.

Kornai Andras et aI., "Recognition of Cursive Writing on Personal Checks," Proceedings of International Workshop on the Frontiers in Handwriting Recognition, Sep. 1996, pp. 1-6.

Rivlin, Alice M. et aI., Chair, Vice Chair—Board of Governors, Committee on the Federal Reserve in The Payments Mechanism—Federal Reserve System, "The Federal Reserve in the Payments Mechanism", Jan. 1998.

J.D. Tygar, Atomicity in Electronic Commerce, Apr./May 1998 (Atomicity).

Anderson, Milton M. "FSML and Echeck", Financial Services Technology Consortium, 1999.

"Full Service Direct Deposit," www.nonprofitstaffing.com/images/upload/dirdepform.pdf, 2001.

Craig, Ben; "Resisting Electronic Payment Systems: Burning Down the House?", Federal Reserve Bank of Cleveland, Jul. 1999.

Rose, Sarah et aI., "Best of the Web: The Top 50 Financial Websites." Money, New York Dec. 1999, vol. 28, iss12; pp. 178-187.

Furst, Karen et ai., "Internet Banking: Developments and Prospects", Office of the Comptroller of the Currency—Economic and Policy Analysis Working Paper 2000-9, Sep. 2000.

Middleware, URL: http://www.cs.umanitoba.ca/maheswar/anc2002/PAPERS/bak01.pdf, Jun. 24, 2008.

Palacios, Rafael et aI., "Automatic Processing of Brazilian Bank Checks", Machine Vision and Applications; 2002, pp. 1-28.

Peter, J. Wallison, "Wal-Mart Case Exposes Flaws in Banking-Commerce Split", American Banker, vol. 167. No. 8, Jan. 17, 2002.

Heckenberg, D., "Using Mac OSX for Real-Time Image Processing," 2003.

Burnett, J., "Depository Bank Endorsement Requirements," Bankersonline.com, http://www.bankersonline.com/cgi-ban/printview.pl, 2003.

Blafore, Bonnie, "Lower Commissions, Fewer Amenities." Better Investing. Madison Heights: Feb. 2003, vol. 52, iss 6; pp. 50-51.

"Direct Deposit Authorization Form" www.umass.edu/humres/library/DDForm.pdf, 2003.

Electronic Billing Problem: The E-check is in the mail-American Banker-v168, n 95, 91, May 2003.

Oxley, Michael G., from committee on Financial Services; "Check Clearing for The 21 st Century Act", 108th Congress—1st session, House of Representatives, report 108-132, Jun. 2, 2003, pp. 1-20.

Shelby, Hon. Richard C. (Chairman, Committee on Baking, Housing and Urban Affairs); "Check Truncation Act of 2003", calendar No. 168, 108th Congress, 1st Session Senate report 108-79, Jun. 25, 2003.

Knestout, Brian P. et aI., "Banking Made Easy" Kiplinger's Personal Fiance, Washington :Jul. 2003, vol. 57 iss 7; pp. 44-47.

Oxley, Michael G, from the committee of conference; "Check Clearing for The 21st Century Act", 108th Congress—1st Sessi9n, House of Representatives, Report 108-291 ,Oct. 1, 2003, pp. 1-27.

Public Law 108-100—108th Congress; "An Act-Check Clearing for the 21 st Century Act". Oct. 28, 2003, [H. R. 1474], 117 Stat. 1177, 12 USC 5001.

Johnson, Jennifer J., Secretary of Board; Federal Reserve System, 12 CFR Part 229, Regulation CC; "Availability of Funds and Collection of Checks", 2009, pp. 1-89.

Mohl, Bruce, "Banks Reimbursing ATM Fee to Compete With Larger Rivals." Boston Globe, Boston, MA., Sep. 2004, pp. 1E.

The Automated Clearinghouse, "Retail Payment Systems; Payment Instruments, Clearing and Settlement; The Automated Clearinghouse (ACH)," www.ffiec.gov/ffiecinfobase/booklets/retaillretail_02d.html, Dec. 2005.

"Two Words Every Business Should Know: Remote Deposit," Canon, http://www.rpsolutions.com/rpweb/pdfs/ canon_rdc.pdf, 2005.

Wells Fargo 2005 News Releases, "The New Wells Fargo Electronic Deposit Services Break Through Banking Boundaries In The Age of Check 21", San Francisco Mar. 28, 2005, wwwwellsfargo.com/press/3282005_check21?year=2005.

Constanzo, Chris "Remote Check Deposit: Wells Captures A New Checking Twist", Bank Technology News Article—May 2005. www.americanbanker.com/btn_article.html?id=20050502YQ50FSG>.

Integrated Data, Message, and Process Recovery for Failure Masking in Web Services, Dissertation zur Erlangung des Grades des Doktors der Ingenieurwissenschaften der Naturwissenschaftlich-Technischen Fakultat I der Universitat des Saari andes, Saarbrucken, im Jul. 2005.

Credit Union Journal, "AFCU Averaging 80 DepositHome Transactions Per Day", Credit Union Journal, Aug. 15, 2005.

"Federal Check 21 Act, New Check 21 Act effective Oct. 28, 2004: Bank No Longer Will Return Original Cancelled Checks," Consumer Union's FAQ's and Congressional Testimony on check 21, www.consumerlaw.orglinitiativeslcontentlcheck21-content.html.

BankServ, "depositNow: What's the difference?", 2006, DepositNow.

http://www.bankserv.com/products/remoteddeposithtm, 2006, Bankserv.

Blue Mountain Consulting, from URL: www.bluemountainconsulting.com. Apr. 26, 2006.

Remotedepositcapture, URL: www.remotedepositcapture.com, 2006.

Onlinecheck.com/Merchant Advisors, "real-Time Check Debit", Merchant Advisors: Retail Check Processing Check Conversion, http://www.onlinecheck/wach/rcareal.htm, 2006.

"Compliance with Regulation CC," http://www/federalreserve.org/Pubsregccregcc.htm, Jan. 24, 2006, 6 pgs.

Chiang, Chuck Chiang, The Bulletin, "Remote banking offered", Feb. 1, 2006, http://bendbulietin.com/apps/pbcs.dll/article? AID=/20060201/BIZ0102/60201 0327&tempi . . . .

Federal Reserve Board, "Check Clearing for the 21st Century Act," FRB, http://www.federalreserve.gov/paymentsystems/turncation/, 2006.

Fest, G., "Patently Unaware," Bank Technology News, 412006, Retrieved from the internet at URL: http://banktechnews.com/article.html?id=20060403T7612618.

Bank Systems & Technology, Untitled Article, 5/112006, http://www.banktech.com/showarticle.jhtml? articleID=187003126>, pp. 1-4, Copyright 2004-2005 CMP Media, LLC.

Digital Transactions News, "An ACH-Image Proposal for Check Roils Banks and Networks", May 26, 2006.

BankServ Press release, "BankServ Announces New Remote Deposit Product Integrated With QuickBooks", San Francisco, Jul. 6, 2006, Remotedepositcapture.com, pp. 1-3.

Remote Deposit Capture News Article, "PNC Bank to Offer Ease of Online Deposit Service Integrated with QuickBooks to Small Businesses", Remote Deposit Capture News Articles from 7/2412006, remotedepositcapture.com, pp. 1-2.

"Check Fraud: A Guide to Avoiding Losses," All Net, http://all.netlbooks/auditlcheckfraud/security.htm, 2007.

"What is check Fraud," National Check Fraud Center, http://www.ckfraud.org/ckfraud.html, 2007.

"Remote Deposit," National City, http://www.nationalcity.com/smallbusiness/cashmanagementlremotedepositldefault.asp, 2007.

"Remote Deposit Capture," Plante & Moran, http://plantemoran.comlindustries/financialinstitutions/banklresourceslcommunity+bank+advisor/2007+summer+issue/remote+deposit+capture.htm, 2007.

"Vitual Bank Checks," Morebusiness.com, http://www.morebusiness.com/running_your_business/businessbitsld908484987.brc, 2007.

Canon, "ImageFormula CR-25, Improve Your Bottom Line With Front-Line Efficiencies", 0117W117, 1207-55/25-1 OM-BSP, 2007.

"It's the easiest way to switch banks," LNB, http://www.inbky.com/pdf/LNBswitch-kit10-07.pdf, 2007.

"Lesson38—More Bank Transactions," Turtle Soft, http://www,turtlesoft.com/goldenseal-software-manual/lesson38. htm, 2007.

"Personal Finance," PNC, http://www.pnc.comlwebapp/unsec/productsandservice.do?sitearea=/PNC/home/personall account+services/quick+switch/quick+switch+faqs, 2007.

"Switching Made Easy," Bank of North Georgia, http://www.banknorthgeorgia.com/cmsmaster/documents/286/documents616.pdf, 2007.

"Chapter 7 Payroll Programs," Uniform staff Payroll System, http://www2.oecn.k12.oh.us/www/ssd1/usps/usps_user_guide_005.html, 2007.

"Check 21 Solutions," Columbia Financial International, Inc. http://www.columbiafinanical.us/check21-solutions.htm, 2007.

"Direct Deposit", University of Washington, http://www.washington.edu/admin/payroll/directdeposit.html, 2007.

"Accept "Customer Not Present"Checks," Accept Check Online, http://checksoftware.com/, 2007.

"Customer Personalized Bank Checks and Address Lables" Checks Your Way, Inc., http://www.checksyourway.com/htm/web_pages/faq.htm, 2007.

"Direct Deposit Application for Payroll," Purdue, http://purdue.edu/payroll/pdf/directdepositapplication.pdf, 2007.

"Frequently Asked Questions," Bank of America, http://www.bankofamerica,com/deposits/checksave/index.cfm?template=1c_faq_bymail, 2007.

Patterson, Scott, "USAA Deposit@Home—Another WOW moment for Net Banking", NextCU.com, 2007.

Remotedepositcapture.com, LLC, "Remote Deposit Capture Overview," ROC Overview, http://remotedepositcapture.com/overview/RDC_overview.htm, Mar. 12, 2007.

Board of Governors of the federal reserve System, "Report to Congress on the Check Clearing for the 21 st Century Act of 2003" Apr. 2007, Submitted to the Congress pursuant to section 16 of the Check Clearing for the 21 st Century Act of 2003.

Image Master, "Photo Restoration: We specialize in digital photo restration and photograp repair of family pictures", http://www.imphotorepair.com, downloaded Apr. 2007.

"Save on ATM Fees", Chicago Tribune, Chicago, IL., Jul. 2007.

Association of German Banks, SEPA 2008: Uniform Payment Instruments for Europe, Berlin, Jul. 2007, Bundesverband deutscher banker eV.

Creativepaymentsolutions.com, "Creative Payment Solutions—Websolution", www.creativepaymentsolution.com/cps/financiaLservices/websolution/default.html, copyright 2008, Creative Payment Solutions, Inc.

"How to Digitally Deposit a Check Image", Smart Money Daily, downloaded 2008.

DCU Member'S Monthly—Jan. 2008, "PC Deposit—Deposit Checks from Home!", http://www.mycreditunionnewsletter.com/dcu/01 08/pagel.html, pp. 1-2, copyright 2008 Digital Federal Credit Union.

"PC Deposit: Deposit Checks From Home!", Digital federal Credit Union, 2008.

Mitek Systems: Mitek Systems Launches First Mobile Check Deposit and Bill Pay Application, Jan. 22, 2008, San Diego, CA.

Windowsfordevices.com, "Software lets camera phone users deposit checks, pay bills",Jan. 29, 2008, www.windowsfordevices.com/news/NS3934956670.html.

Bruene, Jim; "Check Free to Enable In-Home Remote Check Deposit for Consumers and Small Business", NetBanker.com, Feb. 5, 2008, http://www.netbanker.com/2008/02/checkfree_to_enable inhome_rem.html, 1995-2007, Financial Insite, Inc.

CNN.comltechnology, "Scan, deposit checks from home", Feb. 7, 2008, www.cnn.com/2008ITECH/biztech/02/07/check. scanning. ap/index.html.

"WallStreetGrapevine.com" stocks on the rise: JADG, BKYI, MITK; M2 presswire, Coventry: Mar 3, 2008.

The Green Sheet 2.0: Newswire, "CO-OP adds home deposit capabilities to suite of check imaging products", www.greensheet.com/newswire.php?newswire_id=8799., 2009, pp. 1-2.

Matthews, Deborah, "Advanced Technology Makes Remote Deposit Capture Less Risky", Indiana Bankers Association, Apr. 2008.

Bruene, Jim; "Digital Federal Credit Union and Four Others Offer Consumer Remote Deposit Capture Through EasCorp", NetBanker—Tracking Online Finance, Apr. 13, 2008, www.netbanker.com/2008/04/digitaUederal_credit_union_a.html, 1995-2007, Financiallnsite, Inc.

Credit Union Journal, "The Ramifications of Remote Deposit Capture Success", Credit Union Journal—Apr. 14, 2008, www.cujournaL.com/printthis.html?id=20080411 EODZT57G.

Wells Fargo Commercial, "Remote Deposit", www.wellsfargo.com/com/treasury_mgmtlreceivables/electronic/remote_deposit, 1999-2008, Wells Fargo.

Online deposit: faq, http://www.depositnow.com/faq.html Aug. 26, 2008.

Richey, J.C. et aI., "EE 4530 Check Imaging", Nov. 2008.

eCU Technologies, "Upost Remote Deposit Solution", www.eutechnologies.com/products/upost.html, 2009.

Mitek systems, "lmageNet Mobile Deposit Provides Convenient Check deposit And Bill Pay to Mobile Consumers", www.miteksystems.com, 2009.

Affinity Federal Credit Union, "Affinity announces online deposit," Aug. 4, 2005, Affinity Federal Credit Union.

"check 21—The check is not in the post", RedTitan Technology 2004./http://www.redtitan.com/check21/htm, 3 pgs.

Hartly, Thomas, "Banks Check Out New Image", Business First, Buffalo: Jul. 16, 2004, vol. 20, Iss 43, p. 1 , 3 pages.

Wade, Will, "Early Notes: Updating Consumers on Check 21" American Banker Aug. 10, 2004 (3 pages).

De Queiroz, Ricardo et al., "Mixed RasterContent (MRC) Model for Compound Image Compression", Feb. 1999, pp. 1-12.

Dias, Danilo et al., "A Model for the Electronic Representation of Bank Checks", Universidade de Brasilia, undated, believed to have been published prior to Feb. 18, 2009.

"Refractive Index", Wikipedia, the free encyclopedia: http://en.wikipedia.org/wiki/refractiveindex, undated, believed to have been published prior to Feb. 18, 2009.

"Adjusting Brightness and Contrast", www.eaglesoftware.com, undated, believed to have been published prior to Feb. 18, 2009.

Mitek systems, "Imagenet Mobile Deposit", San Diego, CA, 2 pages, undated, believed to have been published prior to Feb. 18, 2009.

Fisher, Dan M., "Home Banking in the 21$^{st}$ Century: Remote Capture Has Gone Retail", May 2008, 4 pages.

"Best practices for producing quality digital image files," Digital Images Guidelines, http://deepblue.lib.umich.edu/bitstream/2027.42/40247/1/Images-Best_Practice.pdf, downloaded 2007 (2 pgs).

"Direct Deposit Application for Payroll", Purdue University, Business Office Form 0003, http://purdue.edu/payroll/pdf/directdepositapplication.pdf, Jul. 2007 (2 pgs).

"Mitek Systems Announces Mobile Deposit Application for Apple iPhone," http://prnewswire.com/cgi-bin/stories/pl?ACCT=104&STORY=/www/story/10-01- . . . , Nov. 25, 2008 (2 pgs).

Albrecht, W. Steve, "Check Kiting: Detection, Prosecution and Prevention," The FBI Law Enforcement Bulletin, Nov. 1, 1993 (6 pgs).

Alves, Vander and Borba, Paulo; "Distributed Adapters Pattern: A Design for Object-Oriented Distributed Applications"; First Latin American Conference on Pattern Languages of Programming; Oct. 2001; pp. 132-142; Rio de Janeiro, Brazil (11 pgs).

Amber Avalona-Butler/Paraglide, "At Your Service: Best iPhone Apps for Military Lifestyle," Jul. 9, 2010 (2 pgs).

Archive Index Systems; Panini My Vision X-30 or VX30 or X30 © 1994-2008 Archive Systems, Inc. P./O. Box 40135 Bellevue, WA USA 98015 (2 pgs).

Automated Merchant Systems, Inc., "Electronic Check Conversion," http://www.automatedmerchant.com/electronic_check_conversion.cfm, 2006, downloaded Oct. 18, 2006 (3 pgs).

BLM Technologies, "Case Study: Addressing Check 21 and RDC Error and Fraud Threats," Remote Deposit Capture News Articles from Jun. 11, 2007, Retrieved from http://www.remotedepositcapture.com/News/june_11_2007.htm on Feb. 19, 2008 (5 pgs).

Bruno, M., "Instant Messaging," Bank Technology News, Dec. 2002 (3 pgs).

Carrubba, P. et al., "Remote Deposit Capture: A White Paper Addressing Regulatory, Operational and Risk Issues," NetDeposit Inc., 2006 (11 pgs).

Century Remote Deposit High-Speed Scanner User's Manual Release 2006, (Century Manual), Century Bank, 2006, (32 pgs).

De Jesus, A. et al., "Distributed Check Processing in a Check 21 Environment: An educational overview of the opportunities and challenges associated with implementing distributed check imaging and processing solutions," Panini, 2004, pp. 1-22.

Debello, James et al., "RDM and Mitek Systems to Provide Mobile Check Deposit," Mitek Systems, Inc., San Diego, California and Waterloo, Ontario, (Feb. 24, 2009), 2 pgs.

DeYoung, Robert; "The Financial Performance of Pure Play Internet Banks"; Federal Reserve Bank of Chicago Economic Perspectives; 2001; pp. 60-75; vol. 25, No. 1 (16pgs).

EFT Network Unveils FAXTellerPlus, EFT Network, Inc., www.eftnetwork.com, Jan. 13, 2009 (2 pgs).

ElectronicPaymentProviders, Inc., "FAQs: ACH/ARC, CheckVerification/Conversion/Guarantee, RCK Check Re-Presentment," http://www.useapp.com/faq.htm, downloaded Oct. 18, 2006 (3 pgs).

Federal Reserve System, "12 CFR, Part 229 [Regulation CC; Docket No. R-0926]: Availability of Funds and Collection of Checks," Federal Registrar, Apr. 28, 1997, pp. 1-50.

Federal Reserve System, "Part IV, 12 CFR Part 229 [Regulation CC; Docket No. R-1176]: Availability of Funds and Collection of Checks; Final Rule," Federal Registrar, vol. 69, No. 149, Aug. 4, 2004, pp. 47290-47328.

Fidelity Information Services, "Strategic Vision Embraces Major Changes in Financial Services Solutions: Fidelity's long-term product strategy ushers in new era of application design and processing," Insight, 2004, pp. 1-14.

Garry, M., "Checking Options: Retailers face an evolving landscape for electronic check processing that will require them to choose among several scenarios," Supermarket News, vol. 53, No. 49, 2005 (3 pgs).

Gupta, Maya R. et al., "OCR binarization and image pre-processing for searching historical documents," Pattern Recognition, vol. 40, No. 2, Feb. 2007, pp. 389-397.

Hale, J., "Picture this: Check 21 uses digital technology to speed check processing and shorten lag time," Columbus Business First, http://columbus.bizjournals.com/columbus/stories/2005/03/14focus1.html, downloaded 2007 (3 pgs).

Hildebrand, C. et al., "Electronic Money," Oracle, http://www.oracle.com/oramag/profit/05-feb/pl5financial.html, 2005, downloaded Oct. 18, 2006 (5 pgs).

Hillebrand, G., "Questions and Answers About the Check Clearing for the 21st Century Act, 'Check 21," ConsumersUnion.org, http://www.consumersunion.org/finance/ckclear1002.htm, Jul. 27, 2004, downloaded Oct. 18, 2006 (6 pgs).

Investment Systems Company, "Portfolio Accounting System," 2000, pp. 1-32.

JBC, "What is a MICR Line?," eHow.com, retrieved from http://www.ehow.com/about_4684793_what-micr-line.html on May 4, 2009 (2 pgs).

Kendrick, Kevin B., "Check Kiting, Float for Purposes of Profit," Bank Security & Fraud Prevention, vol. 1, No. 2, 1994 (3 pgs).

Kiser, Elizabeth K.; "Modeling the Whole Firm: The Effect of Multiple Inputs and Financial Intermediation on Bank Deposit Rates;" FEDS Working Paper No. 2004-07; Jun. 3, 2003; pp. 1-46 (46 pgs).

Levitin, Adam J., Remote Deposit Capture: A Legal and Transactional Overview, Banking Law Journal, p. 115, 2009 (RDC).

Metro 1 Credit Union, "Remote Banking Services," http://ww\\i.metro1cu.org/metro1cu/remote.html, downloaded Apr. 17, 2007 (4 pgs).

Moreau, T., "Payment by Authenticated Facsimile Transmission: a Check Replacement Technology for Small and Medium Enterprises," CONNOTECH Experts-conseils, Inc., Apr. 1995 (31 pgs).

Nelson, B. et al., "Remote deposit capture changes the retail landscape," Northwestern Financial Review, http://findarticles.com/p/articles/mi qa3799/is 200607/ai_n16537250, 2006 (3 pgs).

NetBank, Inc., "Branch Out: Annual Report 2004," 2004 (150 pgs).

NetBank, Inc., "Quick Post: Deposit and Payment Forwarding Service," 2005 (1 pg).

NetDeposit Awarded Two Patents for Electronic Check Process, NetDeposit, Jun. 18, 2007, (1 pg).

Nixon, Julie et al., "Fisery Research Finds Banks are Interested in Offering Mobile Deposit Capture as an," Fiserv, Inc. Brookfield, Wis., (Business Wire), (Feb. 20, 2009), 2 pgs.

Rao, Bharat; "The Internet and the Revolution in Distribution: A Cross-Industry Examination"; Technology in Society; 1999; pp. 287-306; vol. 21, No. 3 (20 pgs).

SoyBank Anywhere, "Consumer Internet Banking Service Agreement," Dec. 6, 2004 (6 pgs).

Teixeira, D., "Comment: Time to Overhaul Deposit Processing Systems," American Banker, Dec. 10, 1998, vol. 163, No. 235, p. 15 (3 pgs).

Thailandguru.com: How and where to Pay Bills @ www.thailandguru.com/paying-bills.html (2 pgs).

Valentine, Lisa, "Remote Deposit Capture Hot Just Got Hotter," ABA Banking Journal, Mar. 2006, p. 1-9.

Whitney et al., "Reserve Banks to Adopt DSTU X9.37-2003 Format for Check 21 Image Services", American Bankers Association, May 18, 2004, http://www.aba/com/NR/rdonlyres/CBDC1 A5C-43E3-43CC-B733- BE417C638618/35930/DSTUFormat.pdf (2 pgs).

Wikipedia ®, "Remote Deposit," http://en.wikipedia.org/wiki/Remote_deposit, 2007 (3 pgs).

Woody Baird Associated Press, "Pastor's Wife got Scammed—She Apparently Fell for Overseas Money Scheme," The Commercial Appeal, Jul. 1, 2006, p. A. 1.

Zions Bancorporation, "Moneytech, the technology of money in our world: Remote Deposit," http://www.bankjunior.com/pground/moneytech/remote_deposit.jsp, 2007 (2 pgs).
Claims as filed on Jan. 20, 2011 for U.S. Appl. No. 13/010,644 (9 pgs).
Claims as filed on Jan. 31, 2011 for U.S. Appl. No. 13/017,865 (11 pgs).
Application as filed on Oct. 8, 2007 for U.S. Appl. No. 11/868,884 (30 pgs).
Claims as filed on Oct. 8, 2007 for U.S. Appl. No. 11/868,878 (4 pgs).
Application as filed on Oct. 29, 2007 for U.S. Appl. No. 11/926,388 (23 pgs).
Application as filed on Oct. 30, 2007 for U.S. Appl. No. 11/928,297 (26 pgs).
Application as filed on Oct. 31, 2007 for U.S. Appl. No. 11/931,670 (47 pgs).
Claims as filed on Oct. 31, 2007 for U.S. Appl. No. 11/931,804 (4 pgs).
Application as filed on Oct. 31, 2007 for U.S. Appl. No. 11/930,537 (27 pgs).
Application as filed on Apr. 3, 2008 for U.S. Appl. No. 12/062,143 (27 pgs).
Claims as filed on Apr. 3, 2008 for U.S. Appl. No. 12/062,163 (3 pgs).
Claims as filed on Apr. 3, 2008 for U.S. Appl. No. 12/062,175 (3 pgs).
Claims as filed on Feb. 16, 2011 for U.S. Appl. No. 13/028,477 (3 pgs).
Application as filed on Jun. 11, 2008 for U.S. Appl. No. 12/137,051 (29 pgs).
Application as filed on Aug. 21, 2008 for U.S. Appl. No. 12/195,723 (38 pgs).
Claims as filed on Sep. 2, 2008 for U.S. Appl. No. 12/202,781 (4 pgs).
Application as filed on Sep. 8, 2008 for U.S. Appl. No. 12/205,996 (30 pgs).
Claims as filed on Sep. 8, 2008 for U.S. Appl. No. 12/206,001 (3 pgs).
Claims as filed on Sep. 8, 2008 for U.S. Appl. No. 12/206,007 (3 pgs).
Claims as filed on May 2, 2011 for U.S. Appl. No. 13/098,566 (10 pgs).
Claims as filed on May 18, 2011 for U.S. Appl. No. 13/110,077 (9 pgs).
Claims as filed on Oct. 24, 2008 for U.S. Appl. No. 12/257,471 (4 pgs).
Application as filed on Oct. 17, 2008 for U.S. Appl. No. 12/253,278 (42 pgs).
Application as filed on Feb. 18, 2009 for U.S. Appl. No. 12/388,005 (37 pgs).
Application as filed on Mar. 4, 2009 for U.S. Appl. No. 12/397,671 (40 pgs).
Application as filed on Mar. 4, 2009 for U.S. Appl. No. 12/397,930 (37 pgs).
Application as filed on Aug. 21, 2009 for U.S. Appl. No. 12/545,127 (45 pgs).
Application as filed on Jul. 27, 2009 for U.S. Appl. No. 12/509,613 (48 pgs).
Application as filed on Jul. 27, 2009 for U.S. Appl. No. 12/509,680 (41 pgs).
Application as filed on Jul. 13, 2006 for U.S. Appl. No. 11/487,537 (23 pgs).
Application as filed on Oct. 31, 2006 for U.S. Appl. No. 11/591,008 (27 pgs).
Claims as filed on Oct. 31, 2006 for U.S. Appl. No. 11/590,995 (3 pgs).
Claims as filed on Dec. 8, 2010 for U.S. Appl. No. 12/963,513 (7 pgs).
Claims as filed on Oct. 31, 2006 for U.S. Appl. No. 11/590,963 (3 pgs).
Application as filed on Oct. 31, 2006 for U.S. Appl. No. 11/590,974 (31 pgs).
Application as filed on Oct. 31, 2006 for U.S. Appl. No. 11/591,273 (56 pgs).
Application as filed on Oct. 31, 2006 for U.S. Appl. No. 11/591,227 (58 pgs).
Claims as filed on Oct. 31, 2006 for U.S. Appl. No. 11/590,998 (4 pgs).
Application as filed on Mar. 15, 2007 for U.S. Appl. No. 11/686,924 (34 pgs).
Application as filed on Mar. 15, 2007 for U.S. Appl. No. 11/686,928 (36 pgs).
Claims as filed on Mar. 15, 2007 for U.S. Appl. No. 11/686,925 (5 pgs).
Application as filed on May 10, 2007 for U.S. Appl. No. 11/747,222 (35 pgs).
Claims as filed on May 10, 2007 for U.S. Appl. No. 11/747,223 (4 pgs).
Application as filed on Oct. 23, 2007 for U.S. Appl. No. 11/877,335 (29 pgs).
Claims as filed on Oct. 23, 2007 for U.S. Appl. No. 11/877,382 (6 pgs).
Application as filed on Oct. 23, 2007 for U.S. Appl. No. 11/876,925 (36 pgs).
Application as filed on Aug. 28, 2009 for U.S. Appl. No. 12/549,443 (41 pgs).
Application as filed on Dec. 20, 2006 for U.S. Appl. No. 11/613,656 (21 pgs).
Claims as filed on Dec. 20, 2006 for U.S. Appl. No. 11/613,671 (3 pgs).
Application as filed on Oct. 25, 2007 for U.S. Appl. No. 11/923,839 (22 pgs).
Application as filed on Aug. 19, 2010 for U.S. Appl. No. 12/859,741 (235 pgs).
Claims as filed on Aug. 19, 2010 for U.S. Appl. No. 12/859,752 (5 pgs).
Application as filed on Sep. 28, 2007 for U.S. Appl. No. 11/864,569 (35 pgs).
Application as filed on Dec. 30, 2010 for U.S. Appl. No. 12/982,494 (280 pgs).
Application as filed on Dec. 30, 2010 for U.S. Appl. No. 12/982,561 (275 pgs).
Application as filed on Dec. 30, 2010 for U.S. Appl. No. 12/982,578 (274 pgs).
Application as filed on Dec. 30, 2010 for U.S. Appl. No. 12/982,594 (275 pgs).
Application as filed on Jun. 8, 2011 for U.S. Appl. No. 13/155,976 (352 pgs).
Application as filed on Jun. 8, 2011 for U.S. Appl. No. 13/156,007 (356 pgs).
Application as filed on Jun. 8, 2011 for U.S. Appl. No. 13/156,018 (353 pgs).
Claims as filed on Dec. 15, 2011 for U.S. Appl. No. 13/327,478 (4 pgs).
Application as filed on Feb. 15, 2012 for U.S. Appl. No. 13/397,405 (19 pgs).
Application as filed Sep. 14, 2012 for U.S. Appl. No. 13/619,405 (30 pgs).
Claims as filed on Dec. 29, 2005 for U.S. Appl. No. 11/320,998 (3 pgs).
Claims as filed on Dec. 29, 2005 for U.S. Appl. No. 11/321,027 (3 pgs).
Claims as filed on Feb. 15, 2012 for U.S. Appl. No. 13/397,437 (6 pgs).
Claims as filed on Sep. 14, 2012 for U.S. Appl. No. 13/619,026 (3 pgs).

* cited by examiner

FIG. 2

Name
Street
City, State

Date _____

$ Amount

Pay to the
order of _____

_____ Dollars

Memo_____        _____

MICR line 255  257  250  260

Name
Street
City, State

Date _____

$ Amount

Pay to the
order of _____

_____ Dollars

Memo_____        _____

MICR line 310  250  320

US 8,452,689 B1

SYSTEMS AND METHODS OF CHECK DETECTION

BACKGROUND

Checks typically provide a safe and convenient method for an individual such as a payor to transfer funds to a payee. To use a check, the individual usually opens a checking account, or other similar account, at a financial institution and deposits funds, which are then available for later withdrawal. To transfer funds with a check, the payor usually designates a payee and an amount payable on the check. In addition, the payor often signs the check. Once the check has been signed, it is usually deemed negotiable, meaning the check may be validly transferred to the payee upon delivery. By signing and transferring the check to the payee, the payor authorizes funds to be withdrawn from the payor's account on behalf of the payee.

While a check may provide a payor with a convenient and secure form of payment, receiving a check may put certain burdens on the payee, such as the time and effort required to deposit the check. For example, depositing a check typically involves going to a local bank branch and physically presenting the check to a bank teller. To reduce such burdens for the payee, systems and methods have been developed to enable the remote deposit of checks. For example, the payee may scan a check in a digital image using a scanner or other imaging device and a computing device. The financial institution may then receive from the payee the digital image of the check. The financial institution may then use the digital image to credit funds to the payee.

However, such a technique requires the efficient and accurate detection of a check in the digital image. Detecting and extracting the check image from the background image in the digital image is difficult.

SUMMARY

A digital image of a check may be divided into segments. The segments may be processed to determine the edges between the background data and the check data in the segments of the digital image. The data outside the edges of the check image portions in the segments may be considered to be background data and may be identified and/or removed. The segments, with the background data identified or removed, may be recombined into an image of the check and provided into a digital image file that may be transmitted to an institution system for deposit of the check in an account.

In an implementation, a histogram of each segment may be determined and used to determine the edges of the check image portions in the segments and thus the edges of the check.

In an implementation, after the segments are recombined, corners of the image of the check may be detected and used to process a copy of the digital image. The processed copy may used for deposit of the check in an account.

In an implementation, convolution filtering may be used on each segment to identify and/or remove background data of each segment.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings:

FIG. 2 is a diagram of an example image comprising check data and background data;

FIG. 3 is a diagram of the example image of FIG. 2 divided into segments;

DETAILED DESCRIPTION

Figure 1:
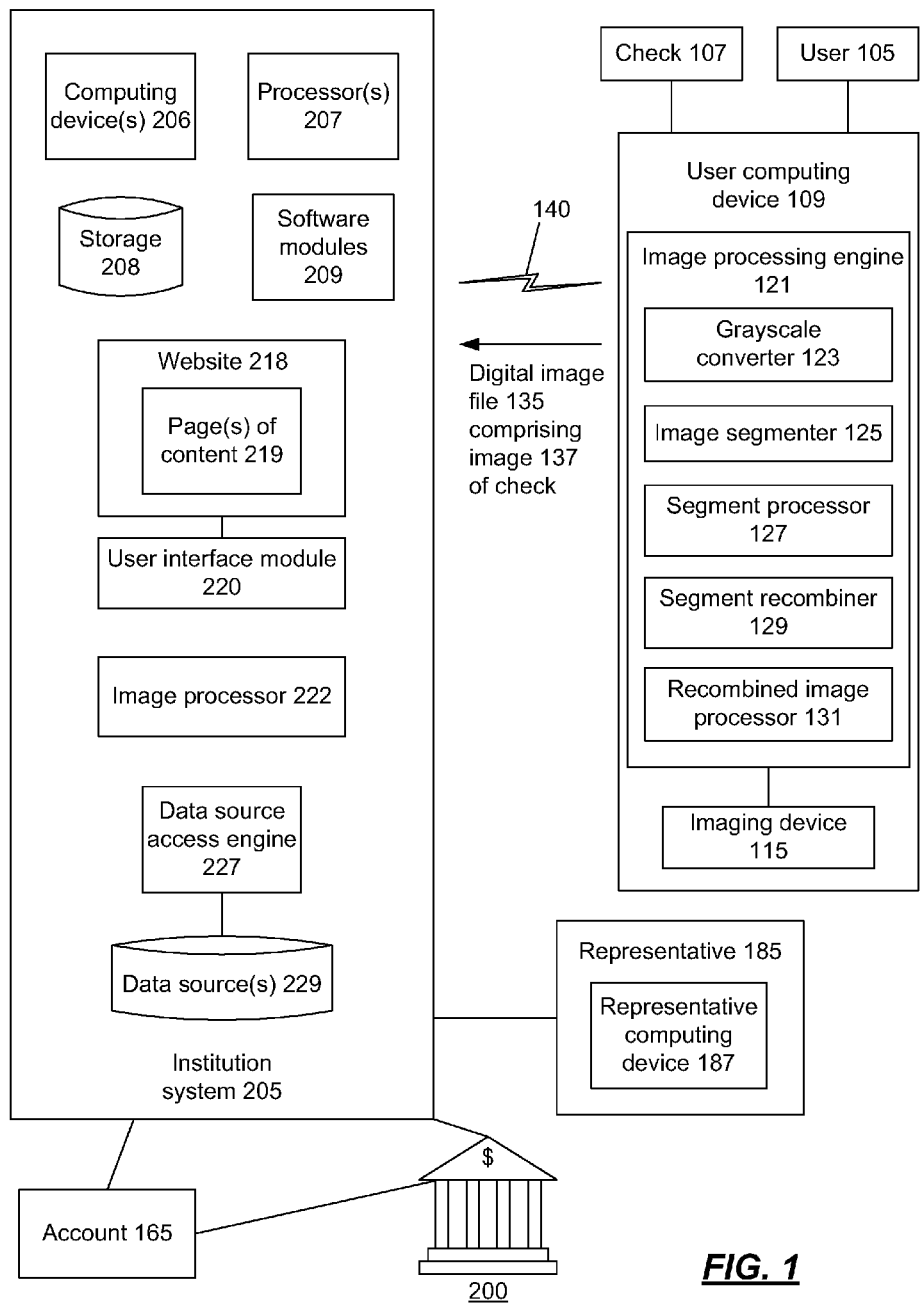
FIG. 1 is a block diagram of an implementation of a system in which example embodiments and aspects may be implemented.

FIG. 1 is a block diagram of an implementation of a system in which example embodiments and aspects may be implemented. A user 105 is shown along with an institution system 205. The institution system 205 may be affiliated with an institution 200, which may be any type of entity capable of processing a transaction involving a negotiable instrument, such as processing checks and/or providing funds associated with checks. For example, the institution 200 may be a financial services institution such as a retail bank, an investment bank, an investment company, a regional branch of the Federal Reserve, a clearinghouse bank and/or a correspondent bank. A representative 185 of the institution 200 may provide assistance.

A negotiable instrument typically includes a type of contract that obligates one party to pay a specified sum of money to another party. Negotiable instruments may include checks, money orders, cashier's checks, drafts, bills of exchange, promissory notes, and the like. A check instructs a financial institution to pay an amount of money from a specific account held in the payor's name with that financial institution to an account held in the payee's name. A money order is a trusted financial instrument that is a payment order for a pre-specified amount of money. It is a more trusted method of payment than a personal check because the funds for the amount shown on the money order must be prepaid. A cashier's check (also known as a bank check, official check, teller's check, bank draft or treasurer's check) is a check guaranteed by a bank and may be purchased from a bank. Cashier's checks are usually treated as cash since most banks clear them instantly.

The user 105 may be an individual or entity who owns an account 165 that may be held at the institution 200 and is accessible via the institution system 205. The account 165 may be any type of account for depositing funds, such as a savings account, a checking account, a brokerage account, and the like. Although only one account 165 is shown, it is contemplated that the user 105 may have any number of accounts held at the institution 200. The user 105 may deposit a check 107 or other negotiable instrument in the account 165 either electronically or physically. The institution 200 may process and/or clear the check 107 or other negotiable instrument.

The user 105 may communicate with the institution 200 and the institution system 205 by way of a communications network 140 such as an intranet, the Internet, a local area network (LAN), a wide area network (WAN), a wireless fidelity (WiFi) network, a public switched telephone network (PSTN), a cellular network, a voice over Internet protocol (VoIP) network, and the like. The user 105 may also communicate with the institution 200 or the institution system 205 by phone, email, instant messaging, text messaging, web chat, facsimile, postal mail, and the like.

The user 105 may remotely electronically deposit the check 107 at the institution 200. It is noted that although examples and implementations described herein may refer to a check, the techniques and systems described herein are contemplated for, and may be used for, any negotiable instrument, such as a money order, a cashier's check, a check guaranteed by a bank, or the like. Similarly, the techniques and systems described herein are contemplated for and may be used with any form or document whose image may be captured with a scanner, camera, or other imaging device for subsequent storage and/or processing.

The user 105 may access the institution 200 via the institution system 205 by opening a communication pathway via the communications network 140 using a user computing device 109. There may be several ways in which the communication pathway may be established, including, but not limited to, an Internet connection via a website 218 of the institution system 205. The user 105 may access the website 218 and log into the website 218 using credentials, such as, but not limited to, a username and a password.

The user 105 may use an imaging device 115, such as a scanner or camera, to generate a digital image of the check 107. The digital image may be used to create a digital image file 135 that may be sent to the institution system 205 and used by the institution 200, in conjunction with the institution system 205, to process a deposit of the check 107 whose image 137 is comprised within the digital image file 135. In an implementation, the digital image file 135 may be augmented by secondary data which may be information relating to the deposit of the check 107, such as an account number and a deposit amount, for example.

The user 105 may place the check 107 on a background and generate a digital image comprising an image of the check (e.g., a check image) and a portion of the background (e.g., a background image) using the imaging device 115 or other device such as a camera that may be standalone or part of a phone or other user computing device. Any background may be used, although a dark background or a consistently colored background may provide more optimal results. In an implementation, white and yellow backgrounds may not be used. It is noted that although examples and implementations described herein may refer to a check image and check data, the term "check image" may refer to any foreground image in a digital image (as opposed to the background image) and the term "check data" may refer to any foreground data in a digital image (as opposed to background data). Thus, the "check image" and the "check data" may refer to the foreground image and foreground data in implementations involving any negotiable instrument, form, or document.

In an implementation, the digital image generated by the imaging device 115 comprises check data and background data. The check data pertains to the check image in the digital image and the background data pertains to the background in the digital image on which the image of the check 107 is disposed. An example of such a digital image is further described with respect to FIG. 2. In an implementation, a minimum ratio of check image size (or area) to background image size (or area) may be provided in the digital image generated by the imaging device 115. Examples include, and are not limited to, at least five percent of the image may comprise a check image, at least one percent of the image may comprise background, the check image may be surrounded by at least one pixel of background all the way around the check image, etc.

As described further herein, the user computing device 109 may comprise an image processing engine 121 that removes some or the entire background data of the digital image generated by the imaging device 115 (or a grayscale image of the digital image generated by the imaging device 115), resulting in an image that has an increased amount of the check image relative to the background image.

The digital image (or a grayscale image of the digital image generated by the imaging device 115) may be divided into plural (i.e., more than one) segments and each segment may be processed to determine the edges between the background image and the check image in the segment. In an implementation, a histogram of each segment may be determined and used to determine the edges of the check image portions in the segments and thus the edges of the check. The data outside the edges of the check image portions in the segments may be considered to be background data and may be identified and/or removed. In an implementation, the segments, with the background data removed, may be recombined into an image 137 of the check 107 and provided into a digital image file 135 that may be transmitted to the institution system 205 for deposit of the check 107 in the account 165.

Thus, the digital image of the check 107 may be divided into segments, processed to remove the background data, and recombined at the user computing device 109 (or the institution system 205 in an implementation). In an implementation, the image processing engine 121 of the user computing device 109 may comprise a grayscale converter 123, an image segmenter 125, a segment processor 127, a segment recombiner 129, and a recombined image processor 131. In an implementation, some of the processes associated with the image processing engine 121 may be executed in parallel. For example, the image segmenter 125 and the segment processor 127, as described further herein, may operate in parallel rather than sequentially.

The grayscale converter 123 may convert the digital image generated by the imaging device 115 to grayscale using known techniques. In photography and computing, a grayscale digital image is an image in which the value of each pixel is a single sample, that is, it carries only intensity information. Images of this sort are composed exclusively of shades of gray, varying from black at the weakest intensity to white at the strongest. Conversion of a color image to grayscale is well known and any known technique(s) may be used.

The grayscale image generated by the grayscale converter 123 may be provided to the image segmenter 125 which may divide the image into a predetermined number of segments, such as 4 segments, 6 segments, 8 segments, etc. Each segment may comprise a portion of the check image (i.e., the check data) and a portion of the background image (i.e., the background data) and an edge between the two portions. The segments may be equal in size or may differ in size. An example of an image divided into segments is further described with respect to FIG. 3.

As described further with respect to the methods 500, 600, 700, and 800 for example, the segment processor 127 may process each of the segments to identify and/or remove background data. In an implementation, histograms may be used to detect or identify background data and check data. The histogram of each segment can be used to determine an edge of the check image in the digital image of the check so that some or the entire background image can be removed or disregarded for subsequent processing.

A histogram is a well known graph and may be used to display where all of the brightness levels contained in an image are found, from the darkest to the brightest. These values may be provided across the bottom of the graph from left (darkest) to right (brightest). The vertical axis (the height of points on the graph) shows how much of the image is found at any particular brightness level. An example of a histogram for a segment of an image comprising check data and background data is further described with respect to FIG. 4.

The segment recombiner 129 may recombine the processed segments to form an image comprising the check. The recombined image processor 131 may process the recombined image (e.g., as described further herein with respect to the methods 500, 600, 700, and 800) and generate a digital image file 135 that may be provided to the institution system 205 for deposit of the check 107 represented as an image 137 in the digital image file 135.

In an implementation, instead of the user computing device 109 performing the image segmentation and segment processing, the image segmentation and segment processing may be performed by the institution system 205 on a digital image file received from the user computing device 109.

The user 105 may thus generate a digital image of the check 107 using the imaging device 115, in an implementation. For example, after endorsing the check 107, the user 105 may use a device such as the imaging device 115 and/or the user computing device 109 for example, to make a digital image of the front sides and/or back sides of the check 107 and storing the digital image(s) in a digital image file. The images of the front side and the back side of the check 107 may be processed using the techniques described herein. The images may be processed as separate files or as images in single file. The images of the front side and the back side of the check 107 may be captured sequentially, e.g., pursuant to the user 105 flipping the check 107 over after an image of the front of the check 107 has been captured.

The digital image file 135 comprising an image 137 of the check may be transmitted to the institution system 205. The user 105 may send the digital image file 135 and any secondary data to the institution system 205 along with a request to deposit the check 107 into an account, such as the account 165. In an implementation, the user 105 may attach the digital image file 135 to an email and send the digital image file 135 to the institution system 205 using the same device used to make the digital image file 135 of the check 107 or another computing device. However, any technique for sending a digital image file 135 to the institution system 205 may be used, such as providing a digital image file 135 from storage to the website 218 associated with the institution system 205.

The institution 200 in conjunction with the institution system 205 may process the deposit request according to the digital image file 135 and any secondary data. Thus, the institution 200 in conjunction with the institution system 205 may process the digital image file 135 comprising the image 137 of the check 107 for deposit.

In an implementation, the institution system 205 may retrieve the image 137 of the check 107 from the digital image file 135 and process the check 107 from the image 137 for deposit. Any image processing technology, software, or other application(s) may be used to retrieve the image 137 of the check 107 from the digital image file 135 and to obtain the relevant data of the check 107 from the digital image file 135. The institution system 205 may determine whether the financial information associated with the check 107 may be valid.

Upon receipt and processing of the digital image file 135 and approval of the check 107 associated therewith, the institution 200 may credit the funds of the check 107 to the account 165. It will be appreciated that the examples herein are for purposes of illustration and explanation only, and that an embodiment is not limited to such examples.

The user computing device 109 may be integral with the device used to make the digital image of the check 107 and/or the digital image file 135 or separate from the device used to make the digital image of the check 107 and/or the digital image file 135. The user computing device 109 may be a personal computer (PC), a handheld computing device, a personal digital assistant (PDA), a mobile phone, or a smartphone, for example. The user computing device 109 may comprise an imaging device 115 such as a camera, scanner, or other device in which an image of the check 107 may be obtained.

In an implementation, the user computing device 109 may be a mobile device that comprises a camera which can capture a digital image of the check 107 by taking a picture of the front and/or back of the check 107. The back of the check may provide endorsement verification, such as the signature of the person or party the check is made out to. The user 105 may send the digital image file 135 to the institution system 205 using the mobile device. An example user computing device 109 is described with respect to FIG. 9. It is contemplated that any device that is capable of generating a digital image may be used to make a digital image of the check 107 which may be processed for sending to the institution system 205 as a digital image file 135. Additional devices that may be used in the generation and/or transmission of a digital image include a digital camera, a photocopier, a fax machine, and the like, for example.

The institution system 205 may include any combination of systems and subsystems such as electronic devices including, but not limited to, computers, servers, databases, or the like. The electronic devices may include any combination of hardware components such as processors, databases, storage drives, registers, cache, random access memory (RAM) chips, data buses, or the like and/or software components such as operating systems, database management applications, or the like. According to an embodiment, the electronic devices may include a network-based server that may process the financial information and may receive the digital image file 135 from the user 105.

The electronic devices may receive the digital image file 135 and may perform an initial analysis on the quality of the image of the check 107 in the digital image file 135, the readability of the data contained therein, or the like. For example, the electronic devices may determine whether the amount payable and other information may be readable such that it may be obtained and processed by the institution 205 to credit the account 165 associated with the user 105.

The institution system 205 may include a user interface module 220, an image processor 222, and a data source access engine 227. The user interface module 220 may generate and format one or more pages of content 219 as a unified graphical presentation that may be provided to the user computing device 109 or a representative computing device 187. In an implementation, the page(s) of content 219 may be provided to the user computing device 109 and/or the representative computing device 187 via a secure website 218 associated with the institution system 205.

In an implementation, the institution system 205 may use the image processor 222 to process the digital image file 135 comprising an image 137 of the check 107 received from the user 105 for use by the institution 200 in the processing and/or clearance of the check 107. The image processor 222 may process multiple frames of the image if the image is comprised of multiple frames (e.g., the front side and the back side of a check).

For example, after receiving the digital image file 135 of the check 107, the image processor 222 may retrieve the image(s) 137 of the check 107 and process the image 137 or an image based on the image 137 for deposit. The image processor 222 may use any known image processing software or other application(s) to obtain the image 137 and any relevant data of the check 107 from the digital image file 135.

The image processor 222 has access to data, files, and documents pertaining to the user 105 as well as any other data, files, and documents that are internal or external to the institution system 205 that may be useful in processing the digital image file 135 and/or the data contained therein.

In an implementation, the image processing engine 121 may be provided at the institution system 105 instead of the user computing device 109. For example, the image processing engine 121, comprising the grayscale converter 123, the image segmenter 125, the segment processor 127, the segment recombiner 129, and the recombined image processor 131, may be comprised within the image processor 222. The functions of the image processing engine 121 may thus be performed at the institution system 105 side as opposed to the user computing device 109 side. In such an implementation, the user computing device 109 may perform some image processing (e.g., the image may be converted to grayscale and compressed) and the resulting processed image may be uploaded to the institution system 105 for processing with the image processing engine 121.

The institution system 205 has the ability to retrieve information from one or more data sources 229 via the data source access engine 227. Data pertaining to the user 105 and/or the user account 165 and/or processing and clearing of a check may be retrieved from data source(s) 229 and/or external data sources. The retrieved data may be stored centrally, perhaps in storage 208. Other information may be provided to the institution system 205 from the user 105 and/or the representative 185.

Data source(s) 229 may contain data, metadata, email, files, and/or documents that the institution system 205 maintains pertaining to the user 105, such as personal data such as name, physical address, email address, etc. and financial data such as credit card numbers and checking account numbers. Such data may be useful for processing the digital image file 135. Additionally or alternatively, the institution 200 or the institution system 205 may access this information when processing or clearing a check.

The representative computing device 187, as well as the user computing device 109, may provide access to a system which is coupled to the institution system 205. A system may be configured to format and transmit a graphical user interface to the representative 185 and/or the user 105, and through the graphical user interface provide the representative 185 and/or the user 105 the ability to interact with information that may be maintained, requested, and/or provided by the institution system 205. As mentioned above, the institution system 205 may provide a unified graphical presentation output. In an implementation, the unified graphical presentation is combined with other materials and transmitted to the representative 185 and/or the user 105.

A user access system may be implemented as a web server in an implementation. The user access system, through the use of any suitable interactive web technology, provides an interactive experience to the user 105 and/or the representative 185 through which access to check processing and clearing data and status and related data can be accomplished. Any technology that provides interactivity through a web browser is considered to be within the scope of the present discussion and may include, without limitation, Hyper-Text Mark-Up Language (HTML), Dynamic HTML (DHTML), JavaScript, and Ajax.

The institution system 205 may comprise one or more computing devices 206. The computing device(s) 206 may have one or more processors 207, storage 208 (e.g., storage devices, memory, etc.), and software modules 209. The computing device(s) 206, including processor(s) 207, storage 208, and software modules 209, may be used in the performance of the techniques and operations described herein.

Examples of software modules 209 may include modules that may be used in conjunction with receiving and processing a digital image file 135 comprising an image 137 of the check 107, retrieving data from the digital image file 135, generating web page content for display, and receiving instructions from the representative 185 or the user 105, for example. While specific functionality is described herein as occurring with respect to specific modules, the functionality may likewise be performed by more, fewer, or other modules. An example computing device and its components are described in more detail with respect to FIG. 9.

FIG. 2 is a diagram of an example image 250 comprising check data 255 (associated with a check image) and background data 260 (associated with a background image). The image 250 may be generated by an imaging device associated with the user computing device 109, such as the imaging device 115. The image 250 comprises check data 255 that is associated with the check 107. The image 250 also comprises background data 260 that is associated with the portion of the image that is not associated with the check 107 (e.g., the background on which the check 107 was placed when the image 250 was generated by the imaging device). An edge 257 separates the check data 255 from the background data 260. The edge 257 may be detected using techniques described herein.

The image 250 may be divided into segments, such as those shown in FIG. 3. FIG. 3 is a diagram of the example image 250 of FIG. 2 divided into segments 310, 320, 330, and 340. Although four segments 310, 320, 330, 340 are shown in FIG. 3, any plural number of segments may be used with techniques described herein. Although the segments 310, 320, 330, 340, are formed by dividing the image 250 into quadrants, the segments may be formed by any techniques, take any shape, and have any area, subject to a constraint that each segment comprises a portion of the check data 255 and a portion of the background data 260 separated by a portion of the edge 257. In this manner, two distinct areas of density corresponding to the background of the image and the check data of the image may be provided in a histogram. In an implementation, each segment only contains a portion of the check data 255 and a portion of the background data 260 separated by a portion of the edge 257 and no additional portions of data (e.g., does not contain additional check data or background data that would give rise to an additional (e.g., a third) distinct area of density in a histogram).

Figure 4:
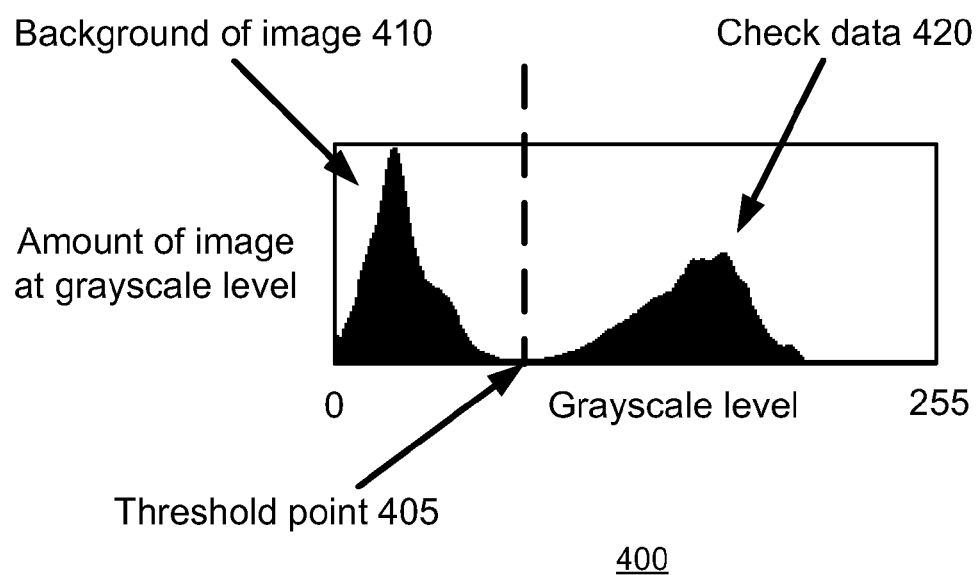
FIG. 4 is a diagram of an example histogram for a segment of an image comprising check data and background data.

As noted above, a histogram may be generated for each segment and used to distinguish between check data and background data (e.g., by determining an edge between the check image and the background image). FIG. 4 is a diagram of an example histogram 400 for a segment of an image comprising check data and background data (such as one of the segments 310, 320, 330, 340 of FIG. 3). The horizontal axis of the histogram 400 represents the grayscale level between 0 and 255, where 0 represents true black and 255 represents true white. The vertical axis represents the amount of the image at a particular grayscale level of the horizontal axis. Any known technique for generating a histogram for a grayscale image may be used. The histogram 400 shows two distinct areas of density (i.e., two distinct density distributions). The density area 410 closer to the grayscale level of zero corresponds to the background of the image, and the density area 420 closer to the grayscale level of 255 corresponds to the check data.

A threshold point 405 (or threshold level) may be determined between the two areas 410 and 420 and may be taken to correspond to an edge between the background data and the check data. The threshold point 405 may be determined using any known technique for determining a minimum between two curves or areas on a histogram. The threshold point 405 may be determined to be in a valley between the peak of the density area 410 and the peak of the density area 420. In an implementation, the threshold point 405 may be determined using the slopes of the two curves corresponding to the areas 410 and 420.

The threshold point 405 may be used to separate the check image from the background image. In an implementation, the portion of the image corresponding to the area to the left of the threshold point 405 may be filtered out of the segment, thereby leaving the check data (and thus the check image) in the segment. In an implementation, thresholding may be accomplished by flooring the values to the left of the threshold point 405, where flooring is making all pixels values in the image 0 (i.e., black) to the left of the threshold point 405, and raising all pixel values to the right of the threshold point 405 to equal 255 (i.e., white) (Range: threshold point to 255).

Figure 5:
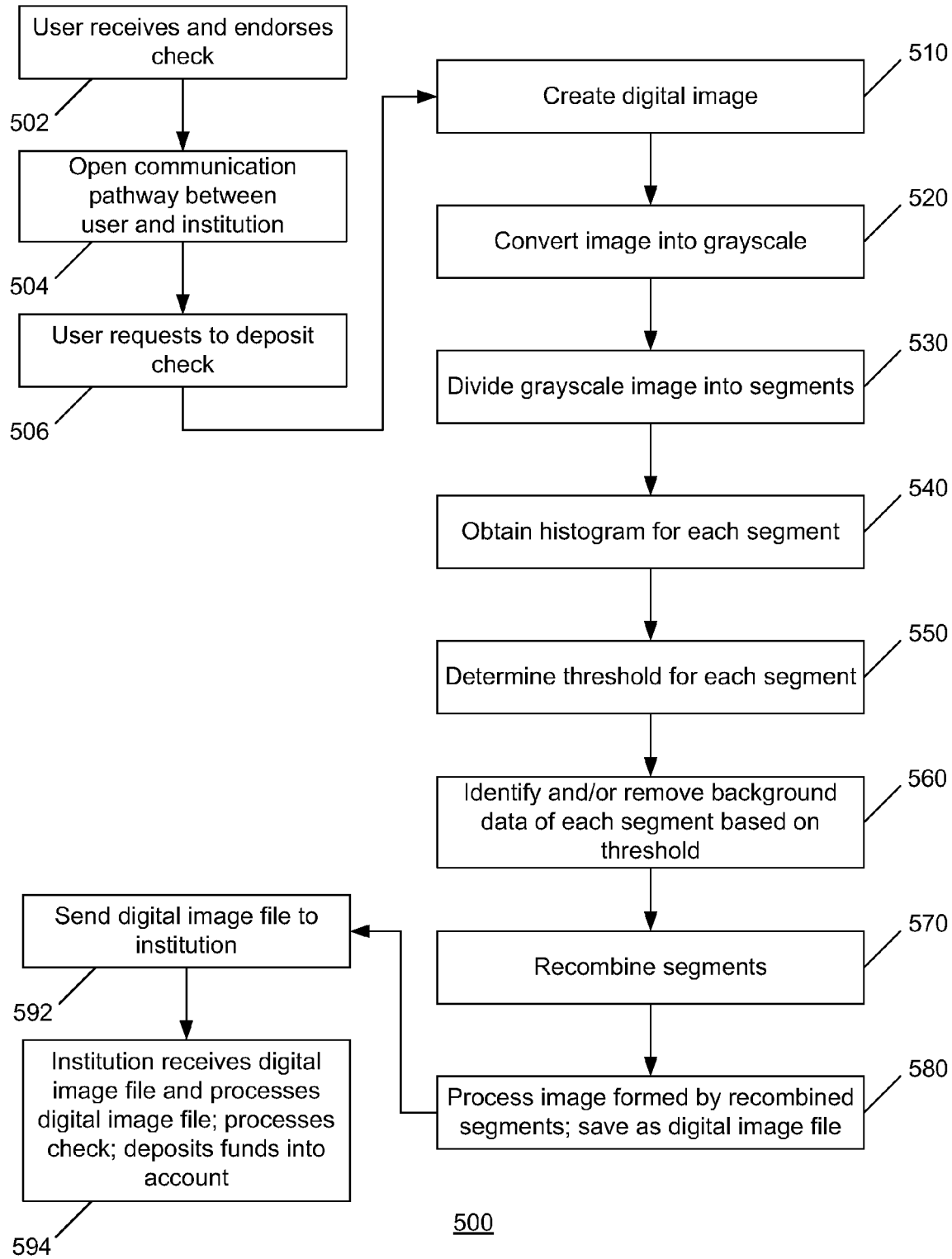
FIG. 5 is an operational flow of an implementation of a method that may be used to detect a check.

FIG. 5 is an operational flow of an implementation of a method 500 that may be used to detect a check. At 502, an account owner (i.e., the payee, referred to herein as a user) may receive a check from a third party (i.e., the payor) and may endorse the check by signing the back of the check in the designated field. If the user wishes to deposit the check into an account, such as a savings and/or checking account, they also may write an account number below the signature.

At 504, the user may open a communication pathway with an institution that may be associated with an account for depositing funds by logging into a website of the institution, for example. There may be several ways in which a communication pathway may be established, including, but not limited to, an Internet connection via a website of the institution. The user may access the website and log into the website using credentials, such as, but not limited to, a username and a password.

At 506, the user may send a request to deposit the check and may select an account in which to deposit the check. In an implementation, the user may select a "deposit check" option provided on the website, and may enter details such as check amount, date, the account the check funds should be deposited in, comments, etc.

At 510, a digital image of the check may be created. There may be several ways in which to create a digital image of the check, including, but not limited to, a scanner, a digital camera, and/or a personal computer (PC). The user may place the check on a background and use the scanner, camera, or other imaging device to create a digital image comprising an image of the check and background. In an implementation, the user may scan or otherwise create a digital image file comprising the front side of the check and the back side of the check.

In an implementation, the user may use a template (e.g., provided by the institution) to arrange the check for scanning. In this manner, the image may comprise the check image in a predetermined position or arrangement that may be easier for the user computing device and/or the institution to identify and/or process.

Alternatively, the user may insert the check into a holder (e.g., provided by the institution). The check may be inserted in the holder in a predetermined position or manner. For example, the check or features of the check such as one or more corners of the check, the signature line, the MICR (magnetic ink character recognition) line, etc., may be aligned with respect to one or more markings or indicators on the holder. It is contemplated that different holders may be used for the front side of the check and for the back side of the check. The positioning or alignment may allow for more efficient processing of the check by the user computing device and/or the institution.

At 520, the image may be converted into grayscale using any known technique. In an implementation, the user computing device may perform the conversion. The resulting grayscale image may be divided into segments at 530. As noted above, the grayscale image may be divided into any plural number of segments of any size or shape subject to the constraint that each segment comprises a portion of the image of the background and a portion of the image of the check with an edge between the two portions.

At 540, a histogram for each segment may be obtained using any known technique(s). For each segment, at 550, a threshold point or level on the histogram may be determined, e.g., between data representing the background and data representing the check. In an implementation, a threshold level may correspond to a threshold point that may be determined as a minimum between the two dense areas on the histogram, described further with respect to FIG. 4.

The background data of each segment may be identified and/or removed at 560. The background data may be identified using the threshold point or level and may be removed from the segment using any known data removal technique(s). In an implementation the segments may be converted to binary image data using the threshold. In an implementation, the data of the image corresponding to the background image (e.g., to the left of the threshold point or level) in the histogram may be scaled such that it becomes black.

The segments may be recombined at 570 by rejoining the segments at the points of division that were used at 530. In an implementation, the segments may be recombined without the background data (e.g., that has been identified and/or removed). In this manner, in an implementation, an image may be formed that primarily comprises check data and comprises very little, if any, background data.

In an implementation, at 580, the image formed by the recombined segments may be processed, e.g., to remove warping or dewarp the image, to crop the image, to deskew the image (e.g., rotate the image to horizontal), to identify the corners, etc. In an implementation, certain points or features (e.g., MICR number, "$" sign, signature line, courtesy amount line, legal amount line, etc.) of the check may be identified and used in lining up or otherwise arranging or processing the image of the check. It is contemplated that any points, coordinates, features, or regions of interest on a negotiable instrument may be used with the techniques described herein. Additionally or alternatively, processing may be performed to remove any background data that was not removed at 560. Additionally, edge detection may be used to identify the edges of the image of the check. Any known edge detection technique may be used.

The resulting image may be saved as a digital image file and sent to the institution at 592. The digital image file may be sent using various means, including, but not limited to, an Internet connection via the website or a cellular transmission. Additionally, the digital image file may be augmented by secondary data which may be information relating to the check, such as an account number, a deposit amount, or a routing number associated with the check, and/or relating to the account for depositing funds, such as the account number and/or the name on the account. The secondary data may be provided to the institution via an image file, an email, a facsimile, instant message, text message, or selection via a website associated with the institution (e.g., after the user opens a communication pathway with the institution, before or after the user sends the digital image file the institution, etc.), for example.

At 594, the institution may receive the digital image file of the recombined segments of the check (along with financial information pertaining to the account for depositing funds and any secondary data in an implementation) and may process the digital image file. Processing of the digital image file may include retrieving financial information regarding the check. The financial information may comprise the MICR number, the routing number, an amount, etc. Any known image processing technology may be used, such as edge detection, filtering to remove imagery except the check image or check data in the received digital image file, image sharpening, and technologies to distinguish between the front and the back sides of the check. The institution may identify and/or remove at least a portion of data that is extraneous to the check, such as background data.

After retrieving the financial information from the check in an electronic data representation form, the institution may determine whether the financial information such as the amount payable to the user, the account associated with the user to deposit funds, an account associated with a payor to debit funds, and an institution associated with the payor, etc., may be valid. For example, the institution may include electronic devices such as computers, servers, databases, or the like that may be in communication with each other. The electronic devices may receive an electronic data representation and may perform an initial analysis on the quality of the data representation, the readability of the data representation, or the like. For example, the electronic devices may determine whether the account number, amount payable, or the like may be readable such that they may be parsed and processed by the institution to credit an account associated with the user.

If the financial information is determined to be valid, the electronic data representation may be processed by the institution, thereby depositing the money in the user's account. If the financial information is determined to be invalid, then the user may be advised For example, the institution may transmit an email, a web message, an instant message, or the like to the user indicating that the financial information associated with the electronic data representation may be invalid. The user may determine how to proceed by selecting an option on the web message, replying to the email, or the like.

Thus, in an implementation, instructions on how the user would like to proceed may be requested from the user, such as whether the user would like to try the deposit again (e.g., make another digital image file and send it to the institution) or whether the user would like assistance from a representative, for example. The user may indicate how they would like to proceed.

If the user would like assistance, the financial information may be transferred to a representative for further review. The representative may review the financial information associated with the electronic data representation to determine whether to allow the electronic data representation to be processed by the institution. If so, the electronic data representation of the financial information may be processed by the institution, thereby depositing the check in the user's account. The institution may send a notice to the user via email, facsimile, instant message, or mail, for example, that the check has been deposited into the selected account.

Figure 6:
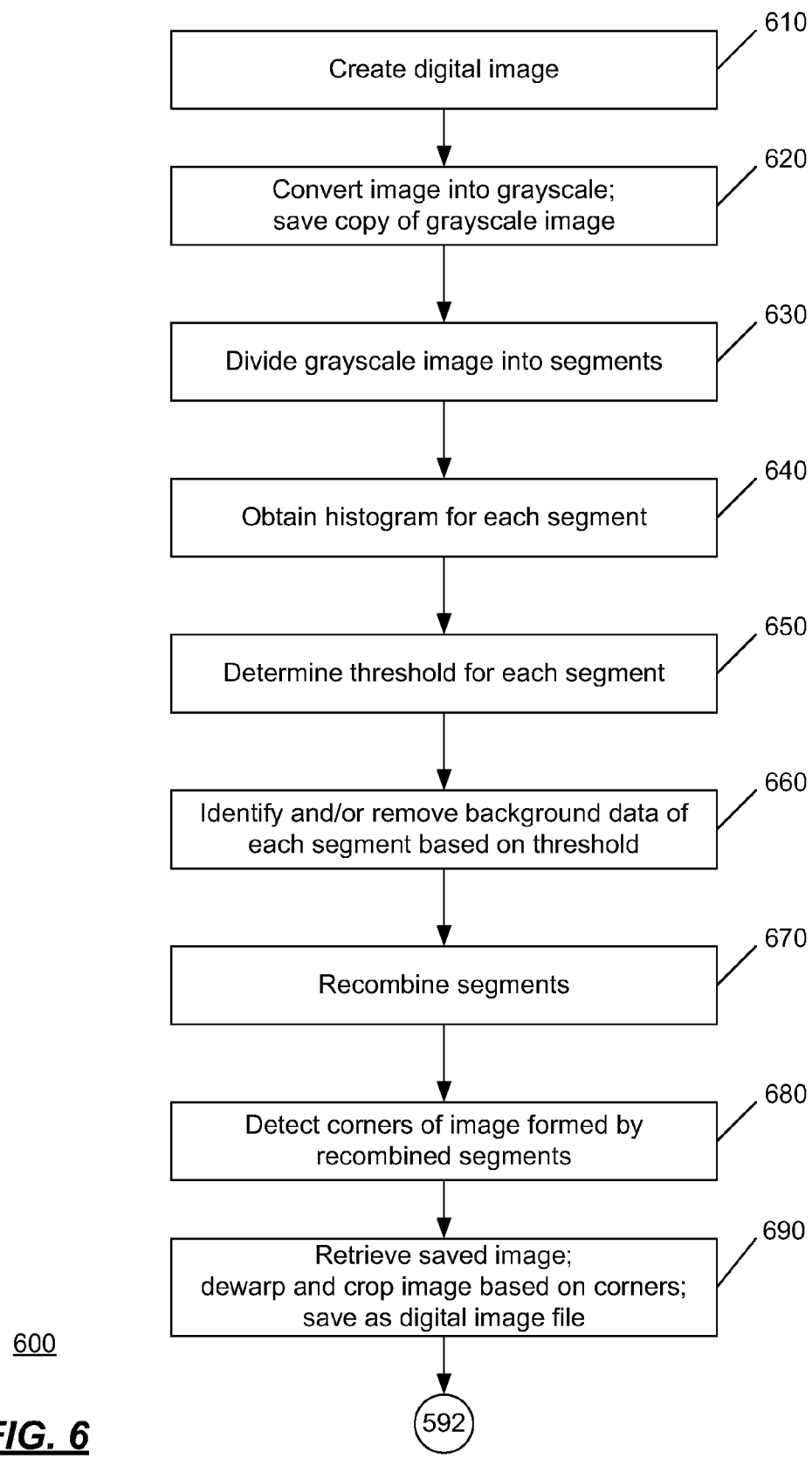
FIG. 6 is an operational flow of another implementation of a method that may be used to detect a check.

FIG. 6 is an operational flow of another implementation of a method 600 that may be used to detect a check. Similar to 510 and 520 of the method 500, a digital image may be created at 610 and converted into grayscale at 620. Additionally, a copy of the grayscale image may be saved in storage, e.g., associated with the user computing device.

Similar to the method 500, the resulting grayscale image may be divided into segments at 630, a histogram for each segment may be obtained using any known technique(s) at 640, and for each segment, at 650, a threshold point or level may be determined, e.g., between data representing the background and data representing the check. At 660, the background data of each segment may be identified and/or removed. These operations are similar to those described at 530, 540, 550, and 560, respectively, and their further descriptions are omitted for brevity.

At 670, the segments may be recombined to form a recombined image by rejoining the segments at the points of division that were used at 630. At 680, the corners of the recombined image may be determined using any known corner detection technique(s). At 690, the copy of the grayscale image that had been saved at 620 may be retrieved from storage. The retrieved copy of the image may be dewarped using the corners determined in the recombined image, and may also be cropped using the corners determined in the recombined image. Additional processing may be performed on the retrieved copy of the image. The retrieved grayscale image that has been processed (e.g., dewarped, cropped, etc.) may be stored as a digital image file and provided to the institution for deposit of the associated check. In implementation, processing may continue at 592.

Figure 7:
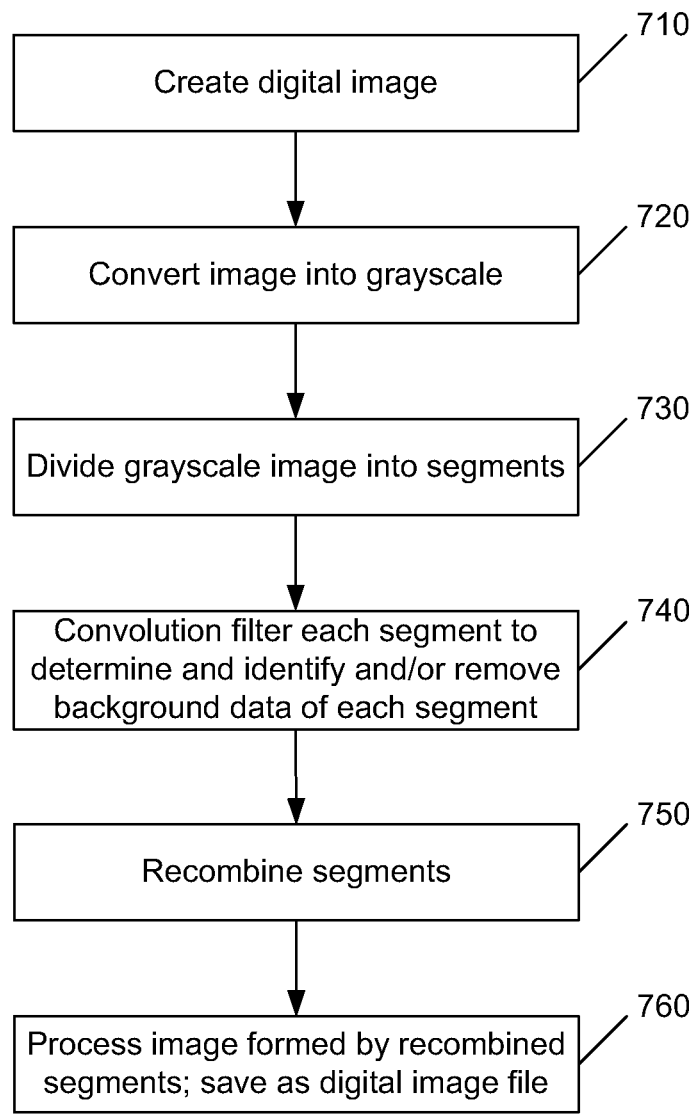
FIG. 7 is an operational flow of another implementation of a method that may be used to detect a check.

In an implementation, convolution filtering may be used in place of histogram thresholding in identifying background data and check data in a digital image of a check. FIG. 7 is an operational flow of another implementation of a method 700 that may be used to detect a check. Similar to the 510 and 520 of the method 500, a digital image may be created at 710 and converted into grayscale at 720. At 730, the resulting grayscale image may be divided into segments, similar to 530.

At 740, each segment may be filtered using a convolution matrix designed to filter and strip out data from each segment. A convolution matrix is a matrix, formed from a vector, whose inner product with another vector is the convolution of the two vectors. Any known convolution matrix filtering technique(s) may be used. In this manner, data such as the background data may be removed from each segment.

At 750, the segments may be recombined to form a recombined image by rejoining the segments at the points of division that were used at 730. At 780, the image formed by the recombined segments may be processed, e.g., to remove warping or dewarp the image, to crop the image, to rotate the image to horizontal, to identify the corners, etc. Additionally or alternatively, processing may be performed to remove any background data that was not removed at 740. The resulting image may be saved as a digital image file and sent to the institution for deposit of the check represented in the digital image file.

Figure 8:
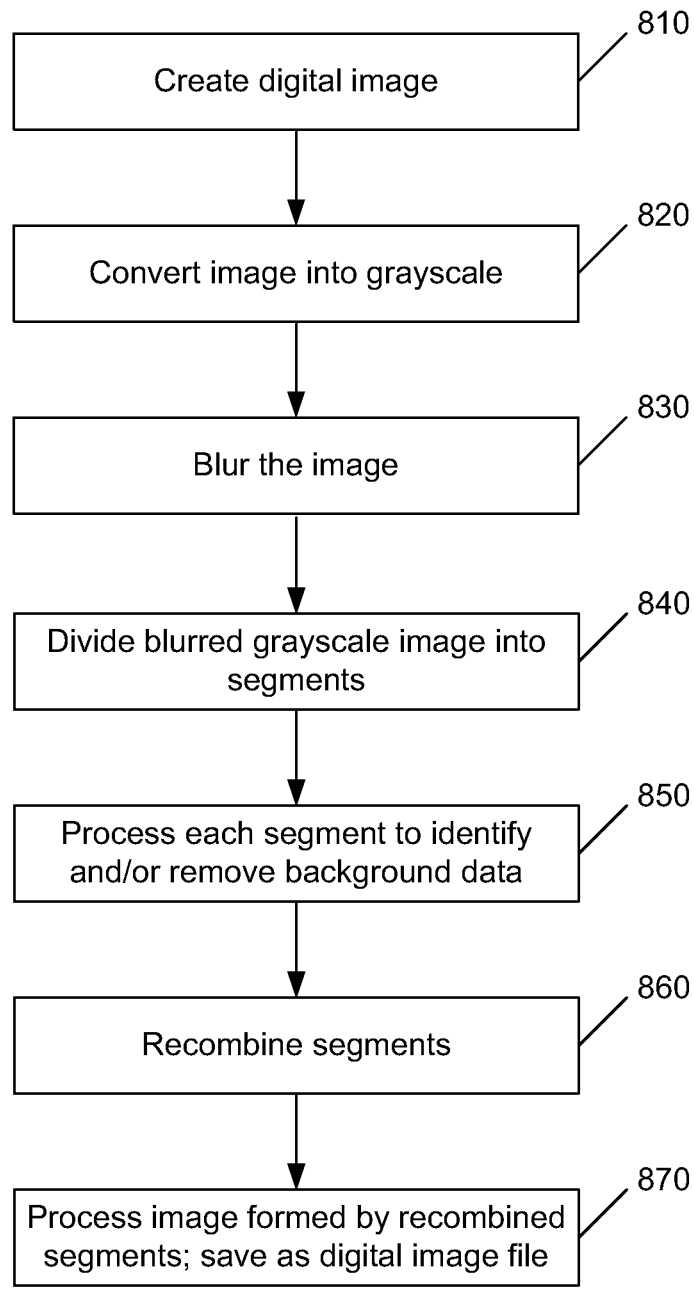
FIG. 8 is an operational flow of another implementation of a method that may be used to detect a check.

In an implementation, instead of using histogram thresholding, the grayscale image may be blurred, divided into segments, and processed. FIG. 8 is an operational flow of another implementation of a method 800 that may be used to detect a check. Similar to the 510 and 520 of the method 500, a digital image may be created at 810 and converted into grayscale at 820.

At 830, the grayscale image may be blurred a predetermined amount. The predetermined amount of blurring may be performed using any known technique(s). For example, a Gaussian blur technique may be used. Gaussian blur describes blurring an image by a Gaussian function. It is a widely used effect in graphics software, typically to reduce image noise and reduce detail and enhance image structures.

At 840, the resulting blurred grayscale image may be divided into segments. Processing may be performed at 850 to identify and/or remove background data. Any processing technique(s), such as those described above, may be used. At 860, the segments may be recombined to form a recombined image, and at 870, the image formed by the recombined segments may be processed as described further above. The resulting image may be saved as a digital image file and sent to the institution for deposit of the check represented in the digital image file.

Although the examples described herein may refer to dividing a check into segments prior to electronically presenting the check for deposit, it is contemplated that any negotiable instrument may be processed using the techniques described herein. Additionally, one or more of the techniques described herein may be performed by the institution instead of the user computing device.

Figure 9:
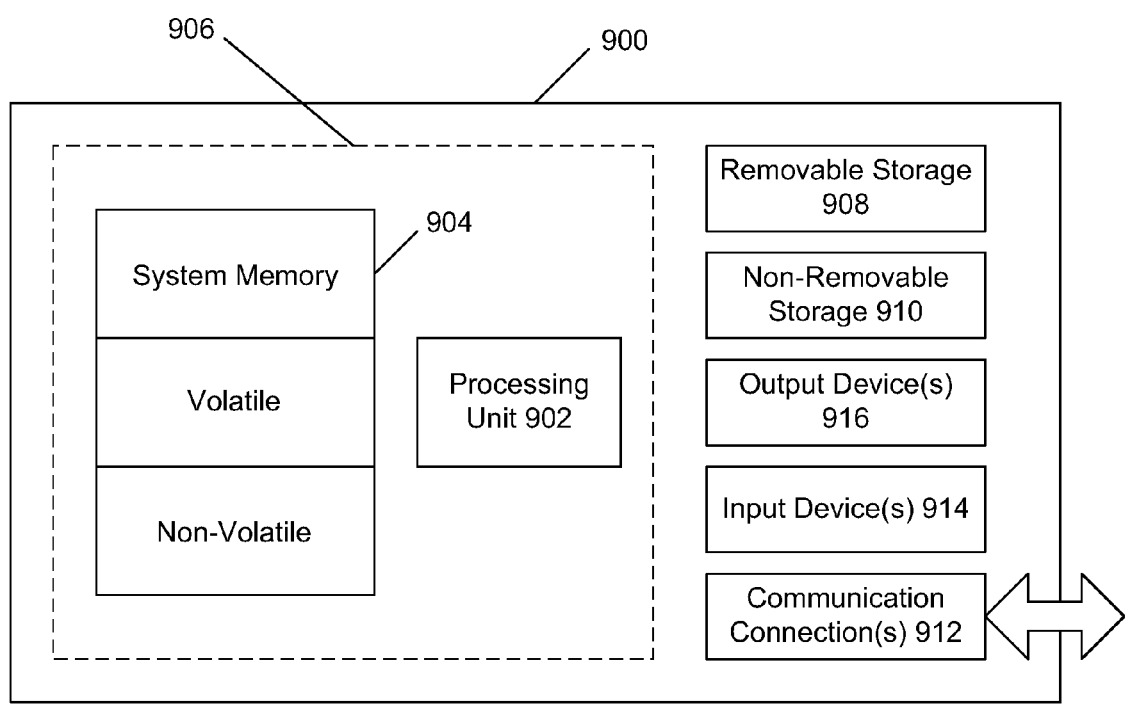
FIG. 9 is a block diagram of an example computing environment in which example embodiments and aspects may be implemented.

FIG. 9 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 9, an exemplary system for implementing aspects described herein includes a computing device, such as computing device 900. In its most basic configuration, computing device 900 typically includes at least one processing unit 902 and system memory 904. Depending on the exact configuration and type of computing device, system memory 904 may be volatile (such as RAM), non-volatile (such as read-only memory (ROM), flash memory, etc.), or some combination of the two. This most basic configuration is illustrated in FIG. 9 by dashed line 906.

Computing device 900 may have additional features and/or functionality. For example, computing device 900 may include additional storage (removable and/or non-removable) including, but not limited to, magnetic or optical disks or tape. Such additional storage is illustrated in FIG. 9 by removable storage 908 and non-removable storage 910.

Computing device 900 typically includes a variety of computer-readable media. Computer-readable media can be any available media that can be accessed by computing device 900 and includes both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 904, removable storage 908, and non-removable storage 910 are all examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of computing device 900.

Computing device 900 may also contain communication connection(s) 912 that allow the computing device 900 to communicate with other devices. Communication connection(s) 912 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 900 may also have input device(s) 914 such as a keyboard, mouse, pen, voice input device, touch input device, etc. Output device(s) 916 such as a display, speakers, printer, etc. may also be included. All these devices are well known in the art and need not be discussed at length here.

Computing device 900 may be one of a plurality of computing devices 900 inter-connected by a network. As may be appreciated, the network may be any appropriate network, each computing device 900 may be connected thereto by way of communication connection(s) 912 in any appropriate manner, and each computing device 900 may communicate with one or more of the other computing devices 900 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program (s) can be implemented in assembly or machine language, if desired. In any case, the language may be a compiled or interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A non-transitory computer-readable medium comprising computer-readable instructions for check detection, said computer-readable instructions comprising instructions for causing a processor to:
   divide a grayscale image of a digital image into a plurality of segments, wherein the digital image includes a check image and a background image, and wherein each segment comprises a portion of the check image and a portion of the background image;
   determine a threshold on a data construct of grayscale levels of each segment between data representing the portion of the check image on the segment and data representing the portion of the background image on the segment;
   identify the portion of the background image using the threshold;
   process each segment to remove the identified portion of the background image;
   recombine the segments to form a digital image file comprising the check image; and
   transmit the digital image file to an institution for processing of a check associated with the check image in the digital image file.

2. The computer-readable medium of claim 1, wherein the data construct of grayscale levels comprises a histogram, and the threshold corresponds to a level on the histogram between a first density area corresponding to the portion of the background image and a second density area corresponding to the portion of the check image.

3. The computer-readable medium of claim 1, further comprising instructions that blur the grayscale image prior to dividing the grayscale image into the segments.

4. A system for check detection, comprising:
   a memory;
   a processor disposed in communication with said memory, and configured to issue a plurality of processing instructions stored in the memory, wherein the processor is configured to:
   create a digital image of a check, the digital image comprising a check image and a background image;
   convert the digital image to a grayscale image;
   divide the grayscale image into a plurality of segments, each segment comprising a portion of the check image and a portion of the background image;
   obtain a data construct of grayscale levels for each segment;
   determine a threshold on the data construct of grayscale levels between data representing the portion of the check image on the segment and data representing the portion of the background image on the segment;
   identify the portion of the background image of each segment using the data construct of grayscale levels; and
   generate an image comprising the check image using the data construct of grayscale levels for each segment and the identified portion of the background image for each segment.

5. The system of claim 4, wherein the processor is further configured to:
   store a copy of the grayscale image prior to dividing the grayscale image into the segments;
   retrieve the copy of the grayscale image after generating the image;
   process the copy of the grayscale image using the image; and
   store a digital image file comprising the processed copy of the grayscale image.

6. The system of claim 5, wherein the processor is further configured to:
   detect a plurality of corners of the image comprising the check image using the data construct of grayscale levels for each segment and the identified portion of the background image for each segment; and
   dewarp and crop the copy of the grayscale image using the corners of the image.

7. The system of claim 5, wherein the processor is further configured to deposit the check into an account using the digital image file.

8. The system of claim 4, wherein each segment comprises only one portion of the check image and only one portion of the background image.

9. The system of claim 4, wherein the processor is further configured to determine a threshold level on the data construct of grayscale levels representative of an edge between the portion of the check image and the portion of the background image, wherein the portion of the background image is identified as being on one side of the threshold level.

10. The system of claim 4, wherein the processor is further configured to recombine the segments after identifying the portion of the background image of each segment.

11. The system of claim 4, wherein the data construct of grayscale levels comprises a histogram.

12. A non-transitory computer-readable medium comprising computer-readable instructions for check detection, said computer-readable instructions comprising instructions for causing a processor to:
receive a grayscale image comprising a digital image, the digital image including a check image and a background image;
determine a plurality of segments of the grayscale image;
determine a threshold on a data construct of grayscale levels of each segment of the grayscale image between data representing a portion of the check image on the segment and data representing a portion of the background image on the segment;
identify the portion of the background image in each of the plurality of segments;
recombine the plurality of segments to form a digital image file comprising the check image without the identified portion of the background image;
and
deposit a check associated with the check image in the digital image file into an account.

13. The computer-readable medium of claim 12, further comprising instructions that generate an image comprising the check image using a camera of a mobile device, wherein the mobile device converts the image to the grayscale image and determines the plurality of segments and recombines the plurality of segments.

14. The computer-readable medium of claim 12, further comprising instructions that generate an image comprising the check image using a camera of a mobile device, wherein the mobile device converts the image to the grayscale image and wherein a financial institution determines the plurality of segments and recombines of the plurality of segments.

15. The computer-readable medium of claim 12, wherein the grayscale image is received at an institution, wherein the institution determines the plurality of segments, recombines the plurality of segments, and deposits the check into the account.

16. The computer-readable medium of claim 12, wherein the data construct of grayscale levels comprises a histogram.

17. The computer-readable medium of claim 16, wherein the instructions that determine the threshold comprise instructions that determine a minimum between two density areas on the histogram.

* * * * *